(12) United States Patent  
Hu et al.

(10) Patent No.: US 12,355,279 B2  
(45) Date of Patent: Jul. 8, 2025

(54) CHARGING SYSTEM AND METHOD

(71) Applicant: HUAWEI TECHNOLOGIES CO., LTD., Guangdong (CN)

(72) Inventors: Zhangrong Hu, Shanghai (CN); Xiaoshan Shi, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 652 days.

(21) Appl. No.: 17/677,860

(22) Filed: Feb. 22, 2022

(65) Prior Publication Data

US 2022/0181890 A1    Jun. 9, 2022

Related U.S. Application Data

(63) Continuation of application No. PCT/CN2019/102292, filed on Aug. 23, 2019.

(51) Int. Cl.
*H02J 7/14*    (2006.01)
*H02J 7/00*    (2006.01)

(52) U.S. Cl.
CPC ........ *H02J 7/0024* (2013.01); *H02J 7/00032* (2020.01); *H02J 7/0068* (2013.01); *H02J 7/00712* (2020.01); *H02J 2207/20* (2020.01)

(58) Field of Classification Search
None
See application file for complete search history.

(56) References Cited

U.S. PATENT DOCUMENTS

| 10,063,069 | B1 | 8/2018 | Huff et al. |
| 2001/0007417 | A1* | 7/2001 | Kitagawa ................. H02J 7/34 |
| | | | 320/128 |
| 2011/0307733 | A1* | 12/2011 | Tokunaga ............... H02J 9/061 |
| | | | 713/340 |
| 2012/0313439 | A1 | 12/2012 | Yamaguchi et al. |

(Continued)

FOREIGN PATENT DOCUMENTS

| CN | 101262140 A | 9/2008 |
| CN | 202111479 U | 1/2012 |
| CN | 102723769 A | 10/2012 |

(Continued)

OTHER PUBLICATIONS

Anonymous et al.,"Components of Cells and Batteries",Jul. 21, 2022 ,total:2pages.

*Primary Examiner* — Arun C Williams

(57) ABSTRACT

A charging system includes a voltage conversion circuit, a control circuit, an input end Vin and an output end Vout. The voltage conversion circuit and the control circuit are connected to M batteries, the input end Vin is connected to an external power supply, and the output end Vout is connected to a load. The control circuit is configured to switch a connection relationship between the M batteries, to connect at least one of the M batteries to the voltage conversion circuit, where the connection relationship includes at least one of a serial connection or a parallel connection. The voltage conversion circuit is connected to the input end Vin and the output end Vout; is configured to receive power from the external power supply through the input end Vin, and charge the at least one battery; and is further configured to supply power to the load through the output end Vout.

17 Claims, 12 Drawing Sheets

(56) References Cited

U.S. PATENT DOCUMENTS

2014/0239896 A1    8/2014   Takeshita

FOREIGN PATENT DOCUMENTS

| CN | 106374560 A | 2/2017 |
| CN | 106786998 A | 5/2017 |
| CN | 207398855 U | 5/2018 |
| EP | 3503282 A1 | 6/2019 |
| WO | 2011105794 A2 | 9/2011 |

* cited by examiner

1300

Select one battery as a first battery to perform discharging, use other undischarged batteries as a second battery, and perform the following procedure for discharging: keeping a power transistor corresponding to a discharging branch of the first battery in a directionally enabled state and a first switch in an on state; keeping a power transistor corresponding to a discharging branch of the second battery in a unidirectionally enabled state; keeping each second switch in an off state; and discharging the first battery — 1301

In response to detecting that a difference between anode electric potentials of the first battery and the second battery is greater than a preset threshold, control a power transistor corresponding to a discharging branch of a discharging battery to be disabled; use a battery whose anode electric potential difference from the anode electric potential of the first battery is greater than the preset threshold as the second battery; and continue to perform the procedure for discharging — 1302

FIG. 13

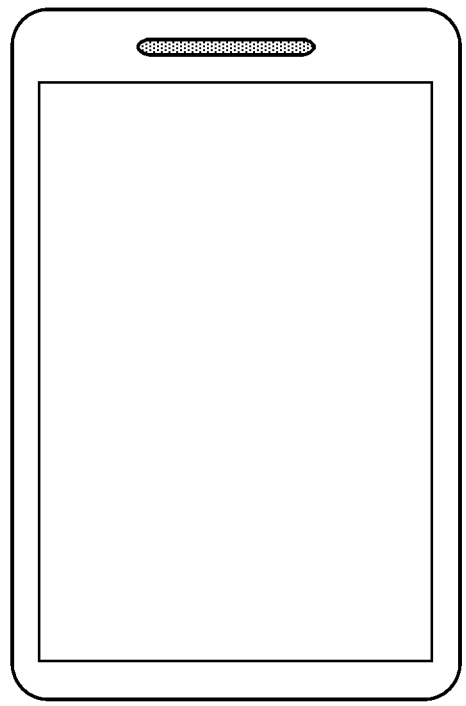

FIG. 14

CHARGING SYSTEM AND METHOD

CROSS-REFERENCE TO RELATED APPLICATIONS

This application is a continuation of International Application No. PCT/CN2019/102292, filed on Aug. 23, 2019, the disclosure of which is hereby incorporated by reference in its entirety.

TECHNICAL FIELD

Embodiments of this application relate to the field of circuit technologies, and in particular, to a charging system and method.

BACKGROUND

As electronic technologies develop, electronic device technologies have also been improved rapidly. In existing electronic device technologies, to meet users' requirements, electronic devices tend to be compact sized, have a large screen and narrow bezels, and provide a long battery life and a fast charging capability.

In the conventional technology, to extend working duration of a mobile electronic device, a plurality of batteries are usually disposed on a screen backplane of the electronic device to supply power to the electronic device. To reduce a quantity of charging circuits in the electronic device to meet the compact design of the electronic device, the electronic device with the plurality of batteries usually uses a single manner of connecting the batteries (for example, a manner of connecting the batteries in series or a manner of connecting the batteries in parallel) to charge and discharge the batteries.

In the related technology, when the batteries are charged in parallel, a storage power of each battery is limited due to restriction of a charge-conducting wire. When the batteries are discharged in series, discharge voltages of the batteries are usually higher than 5 V. A step-down module needs to be added between the batteries and a load to meet a working voltage of the electronic device. In this way, the operation of components in the step-down module causes an energy consumption loss, and power supply efficiency of the batteries is reduced. In addition, to meet the users' requirement for fast charging of the electronic device and match various types of external charging adapters, a manner of connecting the batteries usually needs to be flexibly adjusted, to improve a charging speed and charging efficiency of the batteries. In conclusion, how to perform flexible charging and discharging setting on the plurality of batteries becomes a problem.

SUMMARY

According to a charging system provided in this application, switching a connection relationship between batteries in an electronic device can improve charging and discharging flexibility of the batteries and prolong a battery life of the electronic device.

To achieve the foregoing objectives, the following technical solutions are used in this application.

According to a first aspect, an embodiment of this application provides a charging system, including a voltage conversion circuit, a control circuit, an input end, and an output end. The voltage conversion circuit and the control circuit are connected to M batteries, M is an integer greater than or equal to 2, the input end is connected to an external power supply, and the output end is connected to a load. The control circuit is configured to switch a connection relationship between the M batteries to connect at least one of the M batteries to the voltage conversion circuit, where the connection relationship includes at least one of a serial connection or a parallel connection. The voltage conversion circuit is connected to the input end and the output end; is configured to receive power from the external power supply through the input end, and charge the at least one battery; and is further configured to supply power to the load through the output end.

According to the charging system provided in this application, the connection relationship between the M batteries is switched, so that the batteries may be charged in a plurality of connection manners, and the batteries may be charged and discharged in different connection manners. Second, the charging system can be adapted to a plurality of types of external charging adapters, thereby improving a charging speed and charging efficiency of the batteries.

In an embodiment, the control circuit includes M transistors, M−1 first switches, and M−1 second switches. First ends of the M transistors are connected to the output end, and a second end of each transistor is connected to an anode of one of the M batteries. Each of the first switches is connected between two of the M batteries, and is configured to connect the two batteries in series. Each of the second switches is connected between one of M−1 batteries and a ground, and is configured to connect the one battery to the ground, to connect the one battery and a battery other than the M−1 batteries in the M batteries in parallel.

The transistors of a same quantity as that of the batteries are disposed, the plurality of transistors can independently manage a current flow direction of a branch on which each battery is located under control of a control unit. In this way, in the power system with a plurality of batteries, on a premise of ensuring rated charging and discharging efficiency of the batteries, charging and discharging of each battery can be implemented without requiring symmetry of the batteries, thereby reducing process complexity of each battery in the power system. In addition, in a battery charging and discharging process, the batteries can be prevented from charging each other due to a voltage difference, thereby improving stability of the charging system.

The transistors, the first switches, and the second switches are disposed, so that serial charging of the batteries or parallel charging of the batteries may be implemented based on types of external power adapters. In this way, the charging system can adapt to a plurality of charging manners, thereby improving a charging speed of the charging system.

In an embodiment, the charging system further includes the control unit, configured to: control gates of the M transistors, and control each of the M−1 first switches and each of the M−1 second switches to be turned on or turned off, to switch the connection relationship between the M batteries.

In an embodiment, any one of the M−1 first switches and the M−1 second switches is a transistor switch, and the control unit is configured to control a gate of the transistor switch, to control the transistor switch to be turned on or turned off.

In an embodiment, the control unit is configured to control a gate of any transistor in the M transistors, to control the transistor to work in a unidirectionally enabled state, a bidirectionally enabled state, or a disabled state.

A working state of the transistor is controlled, the batteries may be independently managed, at least one of independent charging, serial charging, and parallel charging of the batteries may be implemented, and at least one of independent discharging and parallel discharging of the batteries may be implemented, thereby improving stability of the charging system.

In an embodiment, the control unit is further configured to: collect operating parameters of the M batteries, control the gates of the M transistors based on the operating parameters, and control each of the M−1 first switches and each of the M−1 second switches to be turned on or turned off, where the operating parameters include at least one of an anode voltage or an anode current.

In this implementation, in the battery charging and discharging process, the connection relationship between the batteries is switched based on the working parameters of the batteries, thereby preventing the batteries from charging each other, and improving stability of the charging system.

In an embodiment, the control unit is further configured to collect an output voltage provided by the voltage conversion circuit to supply power to the load through the output end. The control unit includes a first comparator, configured to: compare an anode voltage of any battery with the output voltage to obtain a first comparison result, and control, based on the first comparison result, a gate of a transistor corresponding to the any battery in the M transistors, to control the transistor to work in a unidirectionally enabled state.

The first comparator is disposed, so that when a transient current of the output end is excessively large due to excessive load energy consumption, and the transient current of the output end exceeds a load capability of the output end, the transistors may be controlled to be unidirectionally enabled, so that the batteries discharge to supplement power for the output end, to suppress a continuous drop of an electric potential of the output end and improve stability of the charging system.

In an embodiment, the control unit further includes a second comparator, configured to: compare an operating parameter of the at least one of the M batteries with a preset parameter to obtain a second comparison result, and control, based on the second comparison result, the output voltage provided by the voltage conversion circuit to supply power to the load through the output end.

The second comparator is disposed, so that in a battery charging process, the voltage conversion circuit adjusts a voltage of the output end based on the second comparison result, so that each battery can be charged based on the preset parameter, thereby improving charging efficiency.

In an embodiment, the voltage conversion circuit includes: a first charging unit configured to charge one of the M batteries or charge at least two batteries connected in parallel in the M batteries; and a second charging unit or a third charging unit configured to charge at least two batteries connected in series in the M batteries.

In this implementation, the charging system can adapt to the plurality of charging and discharging manners, thereby improving charging and discharging flexibility of the batteries.

According to a second aspect, an embodiment of this application provides an electronic device, including the charging system according to any implementation of the first aspect and the M batteries according to the first aspect.

According to a third aspect, an embodiment of this application provides a charging method, including: A control circuit in a charging system switches a connection relationship between M batteries connected to the charging system, to connect at least one of the M batteries to a voltage conversion circuit in the charging system, where the connection relationship includes at least one of a serial connection or a parallel connection, and M is an integer greater than or equal to 2. The voltage conversion circuit receives power from an external power supply through an input end in the charging system. The voltage conversion circuit charges the at least one battery. The voltage conversion circuit supplies power to a load through an output end in the charging system.

BRIEF DESCRIPTION OF DRAWINGS

To describe the technical solutions in the embodiments of this application more clearly, the following briefly describes the accompanying drawings used in describing the embodiments of this application. It is clearly that the accompanying drawings in the following description show merely some embodiments of this application, and a person of ordinary skill in the art may still derive other drawings from these accompanying drawings without creative efforts.

FIG. 13 is a flowchart of a discharging method according to an embodiment of this application; and FIG. 14 is a diagram of an electronic device according to an embodiment of this application.

DESCRIPTION OF EMBODIMENTS

The following clearly describes the technical solutions in the embodiments of this application with reference to the accompanying drawings in the embodiments of this application. It is clearly that the described embodiments are some but not all of the embodiments of this application. All other embodiments obtained by a person of ordinary skill in the art based on the embodiments of this application without creative efforts shall fall within the protection scope of this application.

"First", "second", or the like mentioned in this specification does not indicate any order, quantity, or importance, but is used only for distinguishing between different components. Likewise, "a/an", "one", or the like is not intended to indicate a quantity limitation either, but is intended to indicate existing at least one. "Connection", "link" or the like is not limited to a physical or mechanical connection, but may include an electrical connection, whether directly or indirectly. It is equivalent to coupling or a link in a broad sense.

"Module" mentioned in this specification is usually a functional structure divided based on logic, and the "module" may be implemented only by hardware, or implemented by a combination of hardware and software. In the embodiments of this application, "and/or" describes an association relationship between associated objects and represents that three relationships may exist. For example, A and/or B may represent the following three cases: Only A exists, both A and B exist, and only B exists.

In addition, in the embodiments of this application, the word "example" or "for example" is used to represent giving an example, an illustration, or a description. Any embodiment or design scheme described as the word "example" or "for example" in the embodiments of this application should not be explained as being more preferred or having more advantages than another embodiment or design scheme. The use of the word "example" or "for example" or the like is intended to present a relative concept in a specific manner. In the description of the embodiments of this application, unless otherwise stated, "a plurality of" means two or more than two. For example, a plurality of processing units refer to two or more processing units; and a plurality of systems refer to two or more systems.

To make the objectives, technical solutions, and advantages of this application clearer, the following clearly and completely describes the technical solutions in this application with reference to the accompanying drawings in this application. It is clearly that the described embodiments are some but not all of the embodiments of this application. All other embodiments obtained by a person of ordinary skill in the art based on the embodiments of this application without creative efforts shall fall within the protection scope of this application.

Figure 1:
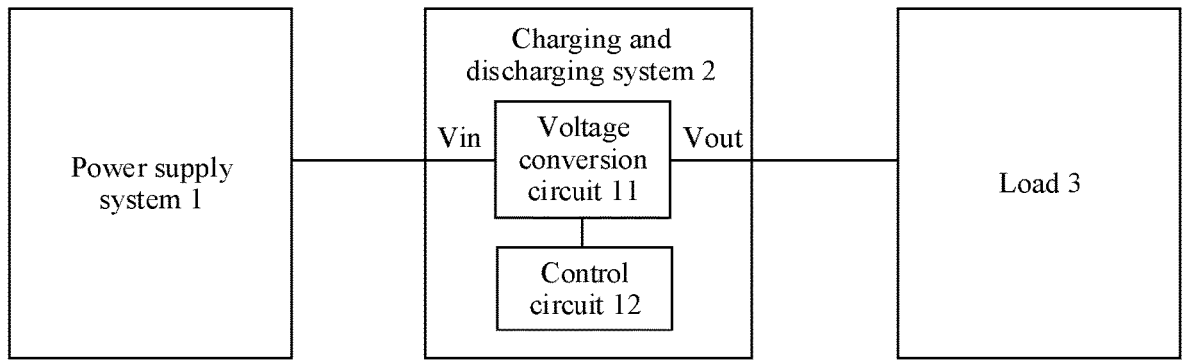
FIG. 1 is a diagram of an application scenario of a charging system according to an embodiment of this application.

FIG. 1 is a diagram of an application scenario of a charging system according to an embodiment of this application. The schematic diagram of the application scenario shown in FIG. 1 includes a power supply system 1, a charging system 2, and a load 3. The power supply system 1 is connected to an input end Vin of the charging system 2, to supply power to the charging system. The power supply system 1 may be an active circuit, and generally includes a voltage source. The power supply system 1 may alternatively include a power grid power supply transmission line and an external power adapter. The charging system 2 is connected to the power grid power supply transmission line through the external power adapter, so that a power grid supplies power to the charging system 2 through the power adapter. An output end Vout of the charging system 2 is connected to the load 3, and is configured to supply power required for running the load 3. The charging system 2 may also be referred to as a charging and discharging system, and can execute a charging function and a discharging function. The charging and discharging system is used to control power to flow from a battery to the load 3 when executing the discharging function. This embodiment focuses on the charging function. Therefore, the charging function is mainly described. The load 3 may be a processor of various types or a component of another type, for example, a graphics processing unit (GPU) or a central processing unit (CPU). The load 3 may alternatively be an integrated circuit chip of various types, and the integrated circuit chip includes but is not limited to an artificial intelligence chip, an image processing chip, and the like. This is not limited herein. As shown in FIG. 1, the charging system 2 includes a voltage conversion circuit 11 and a control circuit 12. The voltage conversion circuit 11 is connected to the input end Vin and the output end Vout of the charging system 2. The control circuit 12 is connected to the voltage conversion circuit 11. Both the voltage conversion circuit 11 and the control circuit 12 are connected to M batteries (the batteries are not shown in the figure). M is an integer greater than or equal to 2. The M batteries may be connected in series, or may be connected in parallel. The control circuit 12 may switch a manner of connecting the M batteries, so that at least one battery is connected to the voltage conversion circuit 11, and the control circuit 12 may perform switching under control of a control unit. The voltage conversion circuit 11 may receive power from the outside through the output end Vin, to charge the at least one battery. The voltage conversion circuit 11 may further supply power to the load 3 through the output end.

With reference to FIG. 2 to FIG. 11, the following describes in detail a structure and a working principle of the charging system 2 shown in FIG. 1. In order to discuss more clearly and completely, the embodiments shown in FIG. 2, FIG. 6, FIG. 9, and FIG. 10 all show the batteries connected to the voltage conversion circuit 11 and the control circuit 12.

Figure 2:
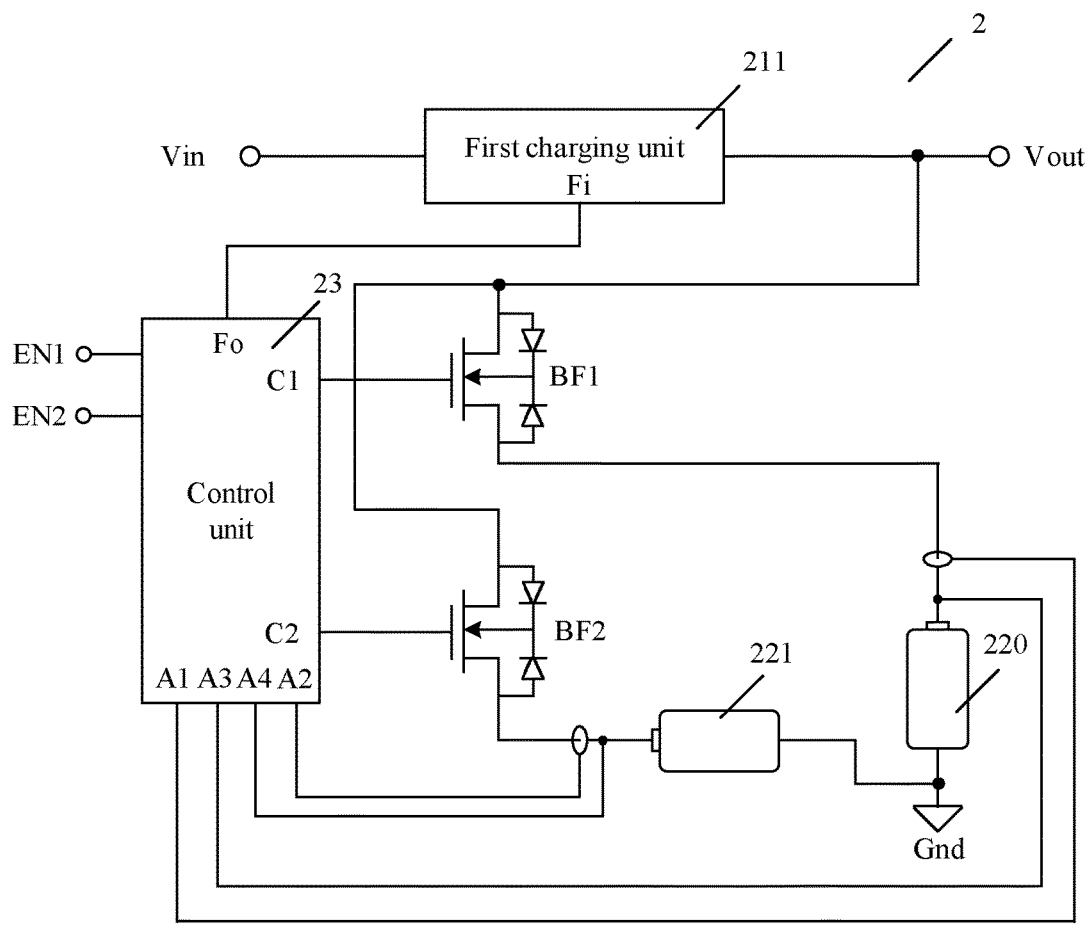
FIG. 2 is a diagram of a charging system according to an embodiment of this application.

FIG. 2 is a diagram of a charging system 2 according to an embodiment of this application. As shown in FIG. 2, the charging system 2 includes the voltage conversion circuit, the control circuit, a control unit 23, the input end Vin, and the output end Vout. The voltage conversion circuit includes a first charging unit 211, and the control circuit includes a first transistor BF1 and a second transistor BF2.

The input end Vin of the charging system 2 may be a power transmission end, for example, a USB port. One side of the input end Vin of the charging system 2 is connected to an input end of the first charging unit 211. In a power supply process or a battery charging process, the other side of the input end Vin of the charging system 2 is connected to the power supply system 1 shown in FIG. 1. An output end of the first charging unit 211 is connected to the output end Vout of the charging system 2. The output end Vout is connected to the load 3 shown in FIG. 1. The power supply system 1 supplies power to the load 3 through the first charging unit 211 and the output end Vout. Alternatively, the batteries in the charging system 2 supply power to the load 3 through the output end Vout.

In an implementation, the first charging unit 211 may be a voltage conversion circuit, for example, a boost-buck conversion circuit or a buck conversion circuit. Generally, the power input to the charging system from the outside cannot directly supply power to the load or charge the batteries. The first charging unit 211 needs to convert a voltage signal or a current signal input from the outside into a voltage signal or a current signal that can directly supply power to the load or meet a charging requirement of the batteries, to supply power to the load or charge the batteries.

In this embodiment, a first end of the first transistor BF1 is connected to the output end Vout of the first charging unit 211, a second end of the first transistor BF1 is connected to an anode of a first battery 220, and a gate of the first transistor BF1 is connected to a control end C1 of the control unit 23. A first end of the second transistor BF2 is connected to the output end Vout and the first end of the first transistor BF1, a second end of the second transistor BF2 is connected to an anode of a second battery 221, and a gate of the second transistor BF2 is connected to a control end C2 of the control unit 23. Cathodes of the first battery 220 and the second battery 221 are connected to a ground of the charging system.

The first transistor BF1 and the second transistor BF2 may be BATFETs. The transistor BATFET may be considered as a special type of transistor. In other words, the BATFET may work in an enabled state or a disabled state under control of a voltage. A working principle of the transistors is described by using the first transistor BF1 as an example. As shown in FIG. 2, the transistor BF1 is enabled under control of the control unit 23, in other words, the control end C1 applies an enable signal to the transistor BF1 (for example, a high-level signal is applied when the transistor BF1 is an N-channel transistor, and a low-level signal is applied when the transistor BF1 is a P-channel transistor). When a voltage difference between an electric potential of the first end and an electric potential of the second end of the transistor BF1 is less than a preset threshold (the preset threshold is usually small, so that the electric potential of the first end and the electric potential of the second end may be approximately equal), the transistor BF1 is bidirectionally enabled. In other words, in this case, a current at the first end of the transistor BF1 may flow to the second end, and a current at the second end may also flow to the first end. When the voltage difference between the electric potential of the first end and the electric potential of the second end of the transistor BF1 is greater than the preset threshold, and the electric potential of the first end of the transistor BF1 is higher than the electric potential of the second end, the transistor BF1 is unidirectionally enabled. In this case, the current at the first end of the transistor BF1 flows to the second end. When the voltage difference between the electric potential of the first end and the electric potential of the second end of the transistor BF1 is greater than the preset threshold, and the electric potential of the first end of the transistor BF1 is lower than the electric potential of the second end, the transistor BF1 is unidirectionally enabled. In this case, the current at the second end of the transistor BF1 flows to the first end. When the control unit C1 applies a disable signal to the transistor BF1 (for example, the low-level signal is applied when the transistor BF1 is the N-channel transistor, and the high-level signal is applied when the transistor BF1 is the P-channel transistor), the transistor BF1 is disabled.

The control unit 23 may include the control ends C1 and C2, signal collection ends A1, A2, A3, and A4, a feedback signal output end Fo, a first enable control end EN1, and a second enable control end EN2. The first enable control end EN1 is a charging enable end. When the first enable control end EN1 receives an enable signal, the charging system works in a charging state. The second enable control end EN2 is a non-charging enable end. In other words, in this state, the charging system may be connected to the external adapter but not charge the batteries or discharge the batteries. Under control of an enable signal input from the first enable control end EN1, the control unit 23 charges the first battery 220 and the second battery 221 by cooperating with the first charging unit 211, the first transistor BF1, and the second transistor BF2. Under control of an enable signal received by the second enable control end EN2, charging of the first battery 220 and the second battery 221 is stopped.

Figure 3:
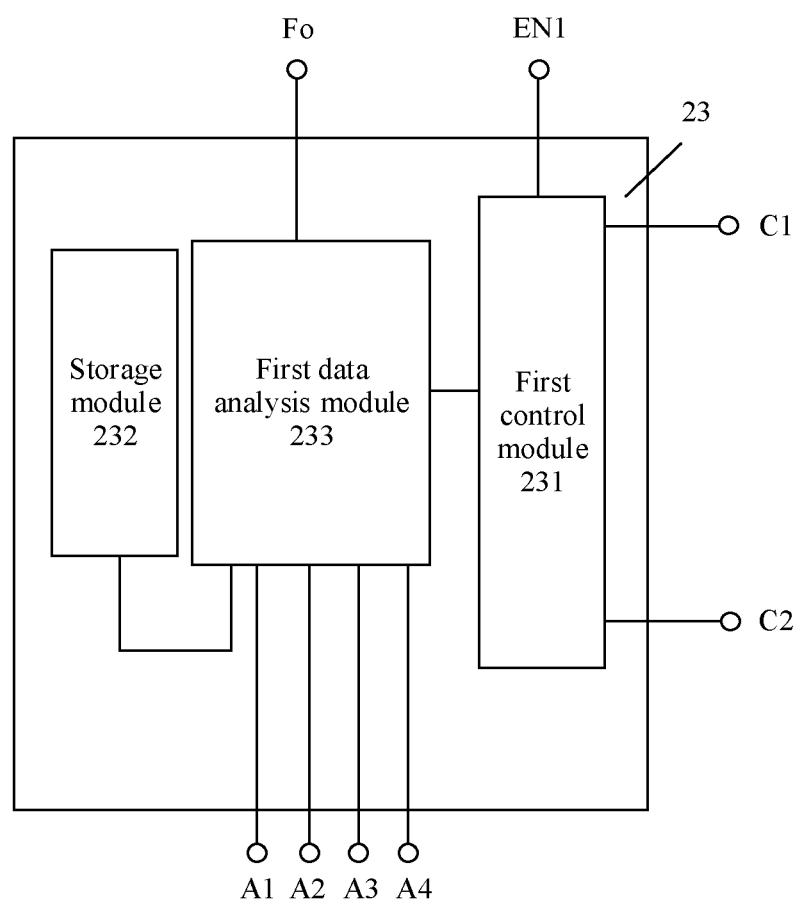
FIG. 3 is a diagram of a control unit according to an embodiment of this application.

FIG. 3 is a diagram of a control unit 23 according to an embodiment of this application. The control unit 23 may further include a first control module 231, a storage module 232, and a first data analysis module 233. The first control module 231 is connected to the gate of the first transistor BF1 and the gate of the second transistor BF2 through the control ends C1 and C2. The first control module 231 may also be connected to an external charging enable control signal source through the first enable control end EN1. Herein, the first control module 231 may include a signal generator that can generate a control signal to control working states of the first transistor BF1 and the second transistor BF2 based on signals sent by the first data analysis module 233 and the external charging enable control signal source. The storage module 232 may be configured to store charging parameters of each battery. The charging parameters may include but are not limited to a preset charging current, a preset constant-current charging voltage, and the like. Herein, the storage module 232 may be a latch. The charging parameters may be written by a user into the storage module 232 in advance based on characteristics of each battery. Because powers, battery capacity, and charging and discharging speeds of the batteries are different, each battery has specific charging parameters. The first data analysis module 233 includes a plurality of first input ends. One first input end collects a charging current of the first battery 220 by using the signal collection end A1. One first input end collects a charging current of the second battery 221 by using the signal collection end A2. One first input end is connected to the anode of the first battery 220 through the signal collection end A3, and is configured to collect an anode voltage of the first battery 220. One first input end is connected to the anode of the second battery 221 through the signal collection end A4, and is configured to collect an anode voltage of the second battery 221. An input end of the first control module 231 is connected to a control signal output end of the first data analysis module 233, and an output end of the storage module 232 is connected to a second input end of the first data analysis module 233. The first data analysis module 233 is connected to a feedback signal input end Fi of the first charging unit 211 through the feedback signal output end Fo. The first data analysis module 233 may periodically collect anode voltage signals and charging current signals of the first battery 220 and the second battery 221. Then, the first data analysis module 233 sends, based on the collected anode voltage signals and the collected charging current signals of the first battery 220 and the second battery 221, and the charging parameters of the batteries obtained from the storage module, a signal for controlling the working states of the first transistor BF1 and the second transistor BF2 to the first control module 231, and a feedback signal to the first charging unit 211. Herein, the feedback signal is used to indicate a difference between the charging current of each battery and a preset charging current of each battery. The first charging unit 211 may adjust an output voltage of the first charging unit 211 based on the feedback signal, so that both a current flowing through the first battery 220 and a current flowing through the second battery 221 reach the preset charging currents of the first battery 220 and the second battery 221, and the first battery 220 and the second battery 221 are charged at the preset charging currents. It should be noted that the first control module 231 may independently control the first transistor BF1 and the second transistor BF2 based on control logic, or may cooperate with the first data analysis module 233 to control the first transistor BF1 and the second transistor BF2 based on the signal sent by the first data analysis module 233.

In this embodiment, the first control module 231, the storage module 232, and the first data analysis module 233 are all integrated into the control unit. The control unit performs signal communication with an external circuit through the ends A1, A2, A3, A4, C1, C2, Fo, EN1, and EN2. In some application scenarios, the user may write the foregoing parameters into the storage module 232 in advance, and then integrate the storage module 232 into the control unit. In some application scenarios, the control unit 23 may further include a data write end (not shown in the figure). Therefore, the user may write parameters such as the preset charging currents, the constant-current charging voltages, constant-current charging duration, and constant-voltage charging duration of the first battery 220 and the second battery 221 to the storage module 232 through the data write end.

In this embodiment, the control unit 23 of the charging system may include the first data analysis module and a second data analysis module. The first data analysis module is enabled in the battery charging process. The second data analysis module is enabled in a battery discharging process.

It should be noted herein that module division of the control unit is not limited to thereto. For example, the first data analysis module and the second data analysis module may be implemented as one module. The first data analysis module, the second data analysis module, and the storage module may be implemented as one module. To describe a working principle of the control unit 23 more clearly, the control unit 23 is logically divided into the foregoing modules. In addition, in some scenarios, the control unit may be alternatively implemented by using another manner (for example, the control unit may be a PLC (programmable logic controller)).

Figure 4:
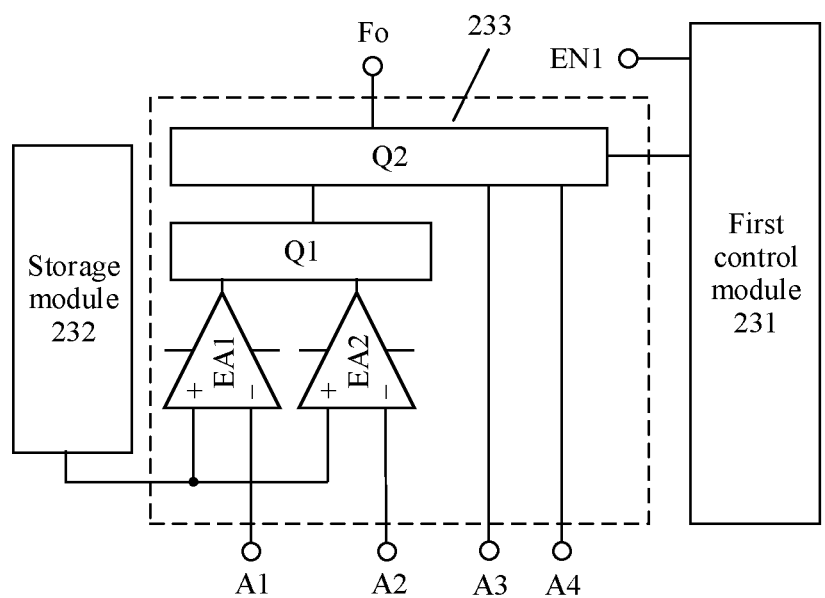
FIG. 4 is a diagram of a first data analysis module according to an embodiment of this application.

FIG. 4 is a diagram of a structure of a first data analysis module 233 according to an embodiment of this application. With reference to the charging system shown in FIG. 2 and the control unit 23 shown in FIG. 3, an internal structure of the first data analysis module 233 and a connection relationship between the first data analysis module 233 and another unit module are described. In FIG. 4, the first data analysis module 233 includes a first error amplifier EA1, a second error amplifier EA2, a first selector Q1, and a second selector Q2. The first selector Q1 includes a plurality of input ends. A first input end of the first error amplifier EA1 is connected to the anode of the first battery 220 through the signal collection end A1 of the control unit 23, a second input end of the first error amplifier EA1 is connected to the output end of the storage module 232, and an output end of the first error amplifier EA1 is connected to one input end of the first selector Q1. A first input end of the second error amplifier EA2 is connected to the anode of the second battery 221 through the signal collection end A2 of the control unit 23, a second input end of the second error amplifier EA2 is connected to the output end of the storage module 232, and an output end of the second error amplifier EA2 is connected to another input end of the first selector Q1. The second selector Q2 includes a plurality of input ends. An output end of the first selector Q1 is connected to one input end of the second selector Q2, and the other two input ends of the second selector Q2 are connected to the signal collection ends A3 and A4 of the control unit 23. An output end of the second selector Q2 is connected to the feedback signal input end Fi of the first charging unit 211 through the feedback signal output end Fo. The first selector Q1 is configured to select a minimum signal value among a plurality of input signal values. The second selector Q2 is configured to select a maximum signal value among the plurality of input signal values.

In an embodiment, the charging system may charge the batteries in a first charging mode. The first charging mode may also be referred to as a battery independent charging mode. In this charging mode, the first battery 220 and the second battery 221 are charged in a time-sharing manner. The first charging mode is described with reference to FIG. 2 to FIG. 4.

The first control module 231 may control the first transistor BF1 to be enabled, and control the second transistor BF2 to be disabled. The first charging unit 211 supplies the power input from the outside to the first battery 220 by using the first transistor BF1, to charge the first battery 220. In a constant-current charging phase, the first charging unit 211 may adjust an electric potential of the output end Vout, so that the first battery 220 is charged at a constant current. The first data analysis module 233 periodically collects the anode voltage of the first battery 220, compares the collected anode voltage with a maximum constant-current charging voltage obtained from the storage module 232. When that the anode electric potential of the first battery 220 reaches the maximum constant-current charging voltage is determined, a constant-voltage charging stage is switched to from the constant-current charging stage. In the constant-voltage phase, the charging current of the battery gradually decreases. When the current decreases to a charging cut-off threshold, it may be determined that the first battery 220 is fully charged. In this case, the first transistor BF1 is controlled to be disabled. Further, the first control module 231 controls the second transistor BF2 to be enabled. The first charging unit 211 supplies the power input from the outside to the second battery 221 by using the second transistor BF2, to charge the second battery 221. For a charging manner of the second battery 221, refer to a charging manner of the first battery 220. Details are not described herein again. When the second battery 221 is fully charged, the second transistor BF2 may be controlled to be disabled.

In some optional implementations, the constant-current charging phase further includes a current detection step. It should be noted that, in the first charging mode, when the first battery 220 is charged, the first selector Q1 selects an error amplification signal provided by the first error amplifier EA1; when the second battery 221 is charged, the first selector Q1 selects an error amplification signal provided by the second error amplifier EA2; and the second selector Q2 may directly provide an error amplification signal provided by the first selector Q1 to the feedback signal input end Fi of the first charging unit 211 by using the feedback signal output end Fo. The first battery 220 is used as an example for a specific description.

The first error amplifier EA1 periodically collects the charging current of the first battery 220, compares the collected charging current with the preset charging current of the first battery 220 stored in the storage module 232, and determines whether the charging current of the first battery 220 reaches the preset charging current. When it is determined that the anode of the first battery 220 does not reach the preset charging current, an error signal between the charging current of the first battery 220 and the preset charging current may be provided to the first charging unit 211 by using the first selector Q1 and the second selector Q2, so that the first charging unit 211 increases the electric potential of the output end Vout, and the charging current of the first battery 220 is increased. When detecting that the charging current of the first battery 220 reaches the preset charging current, the first error amplifier EA1 sends a signal for keeping the electric potential of the output end Vout to the first charging unit 211. In other words, in this case, the anode of the first battery 220 reaches the preset charging current, and constant-current charging is performed at the preset charging current.

In an embodiment, the charging system may charge the batteries in a second charging mode. The second charging mode may also be referred to as a parallel charging mode.

The first control module 231 may control both the first transistor BF1 and the second transistor BF2 to be enabled. The first charging unit 211 supplies the power input from the outside to the first battery 220 by using the first transistor BF1, and supplies the power input from the outside to the second battery 221 by using the second transistor BF2, to charge the first battery 220 and the second battery 221. In the constant-current charging phase, the first charging unit 211 may adjust the electric potential of the output end Vout, so that the first battery 220 and the second battery 221 are charged at the constant current. The data analysis module 233 periodically collects the anode voltages of the first battery 220 and the second battery 221, and determines whether the anode voltages of the first battery 220 and the second battery 221 reach a preset threshold. When determining that an anode voltage of one of the first battery 220 and the second battery 221 reaches the preset threshold, the data analysis module 233 switches from the constant-current charging stage to the constant-voltage charging stage. In the constant-voltage charging phase, the anode voltages of the first battery 220 and the second battery 221 are kept unchanged, and in this case, the charging currents of the first battery 220 and the second battery 221 gradually decrease. The charging system 200 may pre-store preset charging cut-off thresholds of the first battery 220 and the second battery 221. When the charging currents of the first battery 220 and the second battery 221 collected by the first data analysis module 233 reach the preset charging cut-off thresholds of the first battery 220 and the second battery 221, the first transistor BF1 connected to the first battery 220 and the second transistor BF2 connected to the second battery are disabled. In this way, both the first battery 220 and the second battery 221 are fully charged.

Figure 5A:
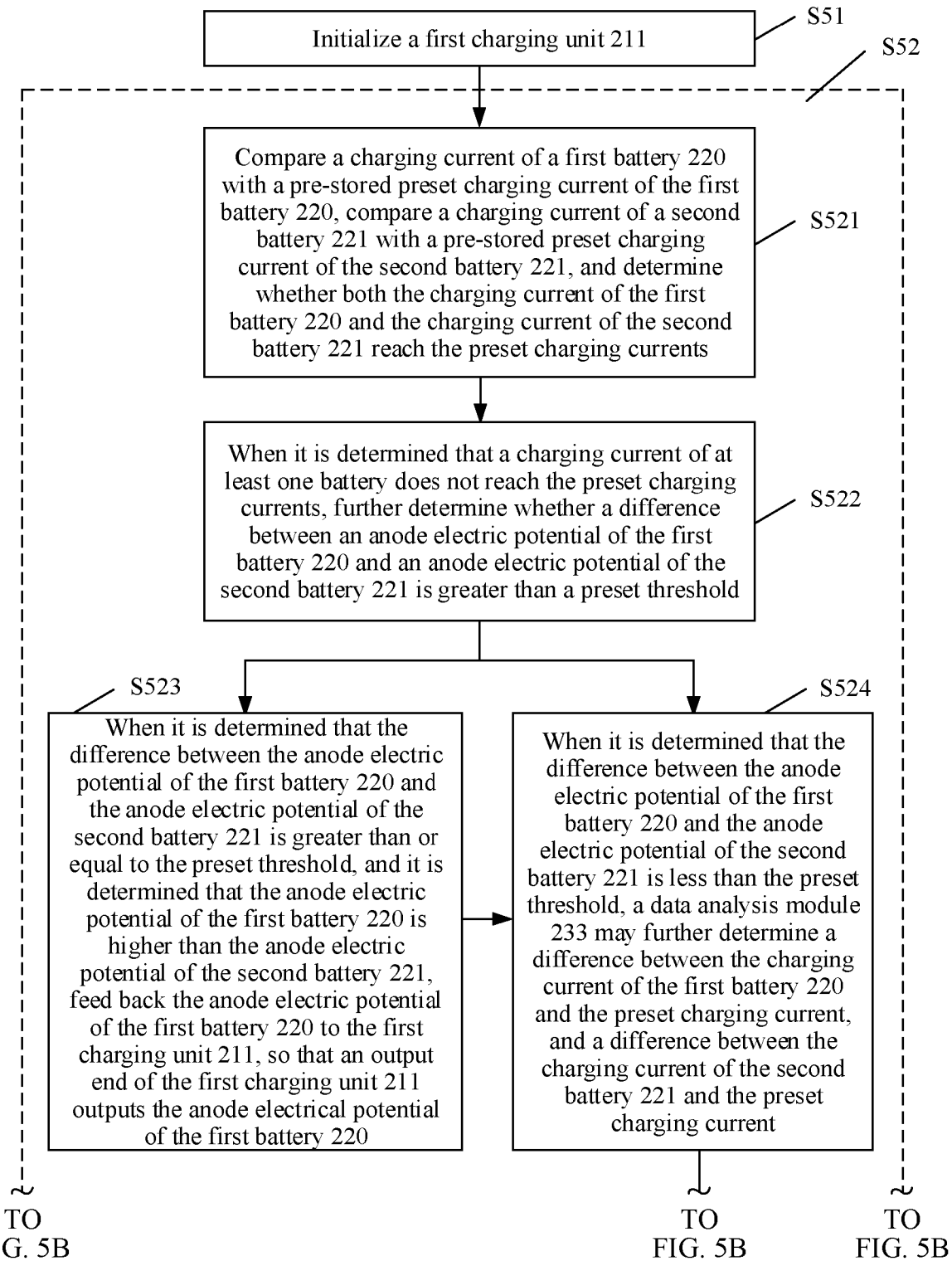
FIG. 5A and FIG. 5B are a flowchart of a working principle of a constant-current charging phase in a second charging mode according to an embodiment of this application; [METHOD?]
Figure 5B:
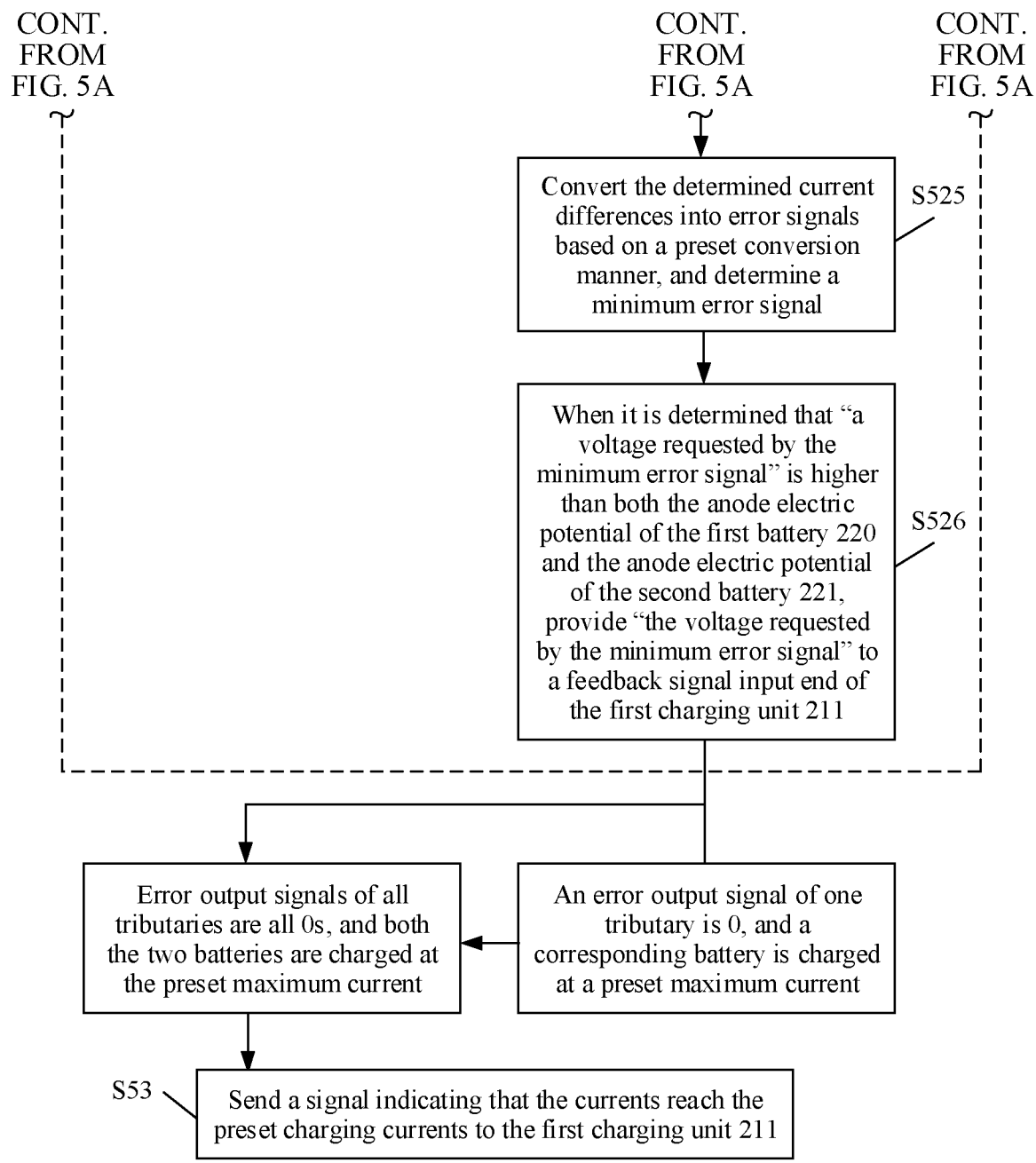

Based on a charging process in the second charging mode, in an embodiment the constant-current charging phase further includes a step of making the charging currents of the first battery 220 and the second battery 221 reach the preset charging currents. FIG. 5A and FIG. 5B are a flowchart of a working principle of a constant-current charging phase in a second charging mode according to an embodiment of this application. The method includes the following steps: Step S51: Initialize the first charging unit 211, so that the electric potential of the output end Vout of the first charging unit 211 is higher than the anode electric potentials of the first battery 220 and the second battery 221.

Step S52: The first data analysis module 233 separately collects the charging currents and the anode voltages of the first battery 220 and the second battery 221, and may perform the following substeps based on the received charging currents and the received anode voltages of the first battery 220 and the second battery 221: Step S521: Compare the charging current of the first battery 220 with the pre-stored preset charging current of the first battery 220, compare the charging current of the second battery 221 with the pre-stored preset charging current of the second battery 221, and determine whether both the charging current of the first battery 220 and the charging current of the second battery 221 reach the preset charging currents.

Step S522: When it is determined that a charging current of at least one battery does not reach the preset charging currents, further determine whether a difference between the anode electric potential of the first battery 220 and the anode electric potential of the second battery 221 is greater than a preset threshold. Step S523: When it is determined that the difference between the anode electric potential of the first battery 220 and the anode electric potential of the second battery 221 is greater than or equal to the preset threshold, and it is determined that the anode electric potential of the first battery 220 is higher than the anode electric potential of the second battery 221, feed back the anode electric potential of the first battery 220 to the first charging unit 211, so that the output end of the first charging unit 211 outputs the anode electric potential of the first battery 220. In this case, the electric potentials of the first end and the second end of the first transistor BF1 are the same, and the transistor BF1 is bidirectionally enabled. An electric potential of the first end of the second transistor BF2 is higher than an electric potential of the second end of the second transistor BF2, and the second transistor BF2 works in a constant-current state, so that the second battery 221 may be charged at the preset charging current.

Step S524: When it is determined that the difference between the anode electric potential of the first battery 220 and the anode electric potential of the second battery 221 is less than the preset threshold, the first data analysis module 233 may further determine a difference between the charging current of the first battery 220 and the preset charging current, and a difference between the charging current of the second battery 221 and the preset charging current.

It should be noted that step S523 and step S524 are parallel steps. In other words, the first data analysis module 233 determines to perform step S523 or step S524 based on the determined difference between the anode electric potential of the first battery 220 and the anode electric potential of the second battery 221. However, in some cases, for example, after step S523 is performed for a period of time, when it is detected that the difference between the anode electric potentials of the two batteries is less than the preset threshold, step S524 may be performed instead.

Step S525: Convert the determined current differences into error signals based on a preset conversion manner, and determine a minimum error signal. Step S526: When it is determined that a voltage requested by the minimum error signal is higher than both the anode electric potential of the first battery 220 and the anode electric potential of the second battery, provide the voltage requested by the minimum error signal to the feedback signal input end of the first charging unit 211.

Herein, the error signals may include a first signal and a second signal. The first signal may be a "logic 0" signal, and the second signal may be a "logic 1" signal. When the error signal is the "logic 0" signal, it indicates that a battery corresponding to the error signal is charged at a preset maximum current. When the error signal is the "logic 1" signal, it indicates that a charging current of a battery corresponding to the error signal does not reach the preset maximum charging current. Therefore, the charging current of each battery is determined based on the error signals, to request corresponding voltages from the first charging unit. In this way, voltages of the first ends of the first transistor BF1 and the second transistor BF2 are both higher than voltages of the second ends of the first transistor BF1 and the second transistor BF2, and both the first transistor BF1 and the second transistor BF2 work in the charging state. Therefore, in the working state, there is a difference in distribution of initial charging currents of the first battery 220 and the second battery 221. After the first battery 220 and the second battery 221 work for a period of time, both the currents of the first battery 220 and the second battery 221 may reach the preset charging currents.

Step S53: After detecting that both the charging current of the first battery 220 and the charging current of the second battery 221 reach the preset charging currents, the first data analysis module 233 sends a signal indicating that the currents reach the preset charging currents to the first charging unit 211. Until this moment, both the first battery 220 and the second battery 221 work in a constant-current charging state.

Figure 6:
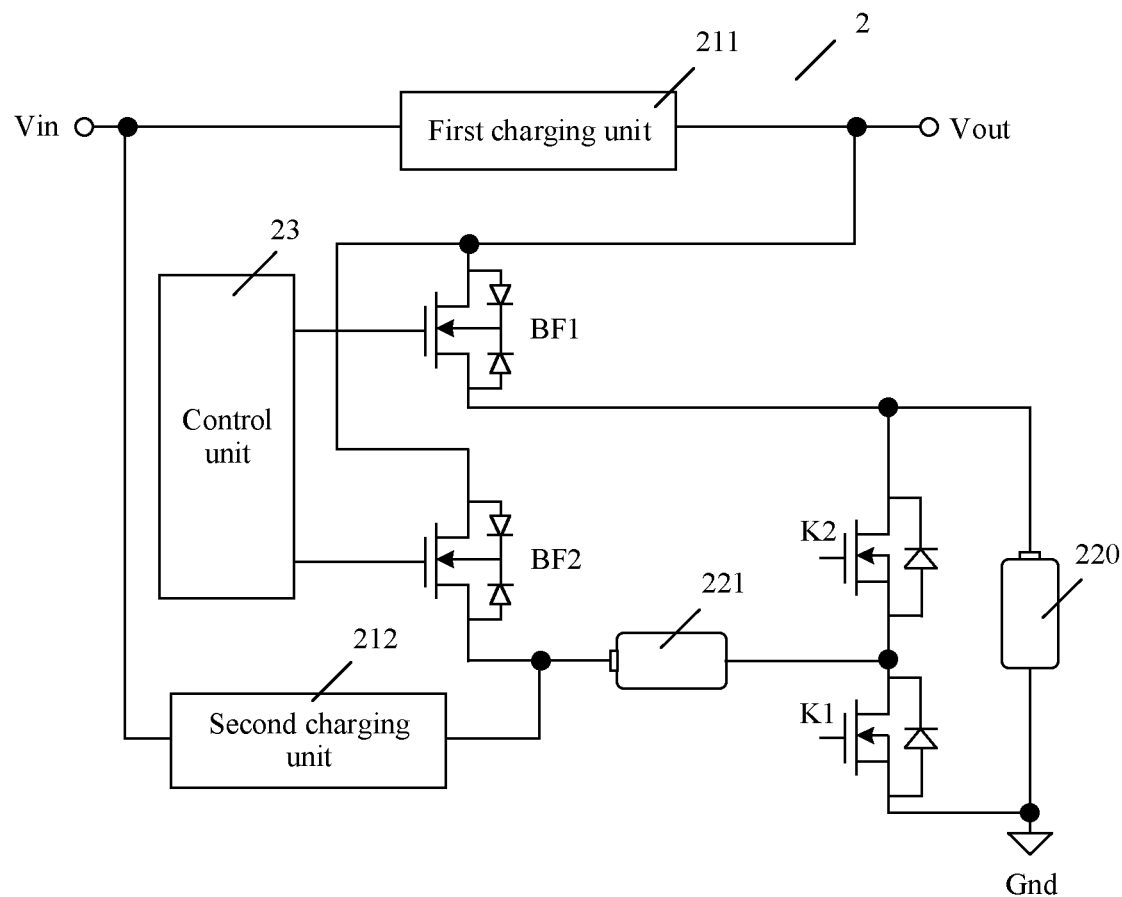
FIG. 6 is a diagram of a charging system according to an embodiment of this application.

FIG. 6 is a diagram of a charging system 2 according to an embodiment of this application. In FIG. 6, the charging system 2 includes the voltage conversion circuit, the control circuit, the control unit 23, the input end Vin, and the output end Vout. The voltage conversion circuit includes the first charging unit 211, and the control circuit includes the first transistor BF1 and the second transistor BF2. The control unit 23 includes the first control module 231, the storage module 232, and the first data analysis module 233. For an internal structure and a connection thereof, refer to the description corresponding to FIG. 2 to FIG. 5A and FIG. 5B. Details are not described herein again.

As shown in FIG. 6, different from the charging system shown in FIG. 2, the control circuit further includes a first switch K1 and a second switch K2. A first end of the first switch K1 is connected to the cathode of the second battery 221, and a second end of the first switch K1 is connected to the ground Gnd. A first end of the second switch K2 is connected to the anode of the first battery 220, and a second end of the second switch K2 is connected to the cathode of the second battery 221. In the charging system shown in FIG. 6, the voltage conversion circuit may further include a second charging unit 212. An input end of the second charging unit 212 is connected to the input end Vin of the charging system 2, and an output end of the second charging unit 212 is connected to the anode of the second battery 221.

It can be learned from FIG. 6 that the first switch K1 cooperates with the second switch K2, so that the first battery 220 and the second battery 221 are connected in series or in parallel. When the first switch K1 is turned on and the second switch K2 is turned off, the first battery 220 and the second battery 221 are connected in parallel. When the first switch K1 is turned off and the second switch K2 is turned on, the first battery 220 and the second battery 221 are connected in series.

In this embodiment, the first charging unit 211 may charge the first battery 220 and the second battery 221 by using the first charging mode or the second charging mode in the embodiment shown in FIG. 2. In this case, the first switch K1 is turned on, and the second switch K2 is turned off. For charging manners of the first charging mode and the second charging mode, refer to the description of the embodiment in FIG. 2. Details are not described herein again.

In this embodiment, the second charging unit 212 cooperates with the first charging unit 211, so that the charging system can charge the batteries in a third charging mode. The third charging mode may be referred to as a serial charging mode. The following describes the third charging mode based on the internal structure of the control unit 23 shown in FIG. 3 and the structure of the charging system 2 shown in FIG. 6.

First, the first switch K1 is controlled to work in an off state, and the second switch K2 is controlled to work in an on state. The first transistor BF1 is controlled to work in the unidirectionally enabled state, and the second transistor BF2 is controlled to be disabled. In this case, the first battery 220 and the second battery 221 are charged in series. The second charging unit 212 converts power obtained from the input end Vin and supplies power to the first battery 220 and the second battery 221. In this case, the first transistor BF1 allows a current to flow from the anode of the battery to the output end Vout of the charging system.

Then, the first data analysis module 233 in the control unit 23 periodically collects the anode voltages of the first battery 220 and the second battery 221, compares the collected anode voltages with the maximum constant-current charging voltage obtained from the storage module 232 based on the collected anode voltages, and determines whether there is an anode of a battery that reaches the maximum constant-current charge voltage.

When it is determined that there is the anode electric potential of the battery that reaches the maximum constant-current charge voltage, the constant-voltage charging stage is switched to from the constant-current charging stage. In this case, the first control module 231 controls the second transistor BF2 to be disabled, and keeps the first transistor BF1 in an enabled state. The first data analysis module 233 sends a feedback signal to the first charging unit 211, so that the first battery 220 is charged at a constant voltage. When determining that the charging cut-off threshold of the second battery is reached, the first control module 231 may determine that the first battery 220 is fully charged. In this case, the first control module 231 controls the first transistor BF1 to be disabled. At the same time, the first control module 231 controls the second transistor BF2 to be enabled, so that the first battery 220 is charged at the constant voltage. When determining that the charging cut-off threshold of the second battery is reached, the first control module 231 may determine that the second battery 221 is fully charged, and may control the second transistor BF2 to be disabled.

In an embodiment, the charging further includes a step of making the first battery 220 and the second battery 221 reach the maximum charging currents in the constant-current charging stage.

In a serial charging phase, when one of the first battery 220 and the second battery 221 reaches the preset charging current, parallel charging may be switched to from serial charging. In other words, in this case, the second switch K2 is turned off, and the first switch K1 is turned on, so that the first switch is in the on state, and the batteries continue to be charged by using the first charging mode or the second charging mode until one of the batteries reaches the preset maximum charging current.

In an embodiment, the charging system may charge the batteries in a fourth charging mode. The fourth charging mode may be referred to as a serial charging mode. In the fourth charging mode, the first charging unit 211 is enabled.

In the fourth charging mode, the second transistor BF2 is controlled to be in a bidirectionally enabled state, and the first transistor BF1 is controlled to be in the unidirectionally enabled state or the disabled state. Herein, that the first transistor BF1 is unidirectionally enabled means that the first transistor BF1 allows a current to flow from the anode of the battery to the output end Vout of the charging system.

The first switch K1 is controlled to be in the off state, and the second switch is controlled to be in the on state. In this case, the first charging unit 211 charges the first battery 220 and the second battery 221 by using the second transistor BF2 and the second switch K2. For a working principle of the serial charging mode, refer to the description of the third charging mode. Details are not described herein again.

It should be noted that, in the third charging mode and the fourth charging mode, the first transistor BF1 is set in the unidirectionally enabled state, so that when load energy consumption is extremely large for a function of the first charging unit 211, the batteries can participate in power supply in time. Therefore, a drop of the voltage of the output end Vout is suppressed. It can be learned from FIG. 6 that, in addition to beneficial effects of the charging system shown in FIG. 2, in the embodiment shown in FIG. 6, the first charging unit, the second charging unit, the first switch K1, and the second switch K2 are integrated into the charging system. In this way, the charging system may select a charging mode based on a structure of the external power adapter, thereby improving charging efficiency of the charging system, providing effective protection for the batteries, avoiding undercharging or overcharging of the batteries, and improving utilization of the batteries.

It should be noted that the third charging mode and the fourth charging mode have a same working principle. In other words, the fourth charging mode may be considered as a replacement for the third charging mode. A difference is that in the third charging mode, the batteries are charged in series by using the second charging unit; and in the fourth charging mode, the batteries are charged in series by using the first charging unit and one of the transistors.

Figure 7:
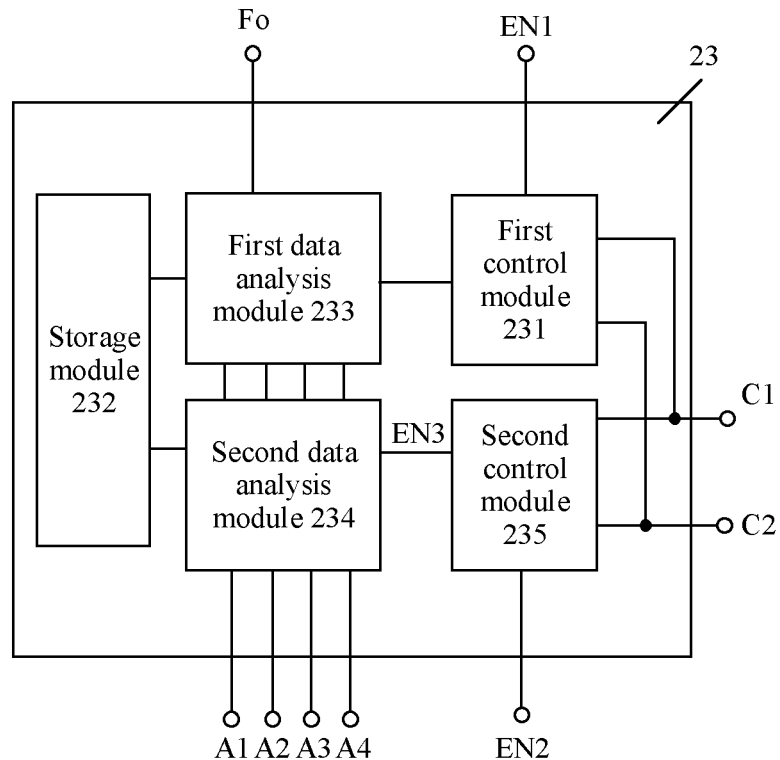
FIG. 7 is a diagram of a control unit according to an embodiment of this application.

FIG. 7 is a diagram of a control unit 23 according to this application. In FIG. 7, the control unit 23 includes a first control module 231, a storage module 232, a first data analysis module 233, control ends C1 and C2, signal collection ends A1, A2, A3, and A4, a feedback signal output end Fo, and a first enable control end EN1. For a connection relationship, structures, and working principles of the modules and the ends, refer to the related description of the control unit 23 shown in FIG. 3. Details are not described herein again.

Different from the control unit shown in FIG. 3, in FIG. 7, the control unit 23 further includes a second data analysis module 234 and a second control module 235.

The second data analysis module 234 includes a plurality of first input ends. One first input end collects the charging current of the first battery 220 by using the signal collection end A1. One first input end collects the charging current of the second battery 221 by using the signal collection end A2. One first input end is connected to the anode of the first battery 220 through the signal collection end A3, and is configured to collect the anode voltage of the first battery 220. One first input end is connected to the anode of the second battery 221 through the signal collection end A4, and is configured to collect the anode voltage of the second battery 221. The second data analysis module includes a plurality of output ends; the plurality of output ends are connected to first input ends of the first data analysis module 233 in a one-to-one correspondence, and provide collected charging current signals and voltage signals of the first battery 220 and the second battery 221 for the first data analysis module 233. A second input end of the second data analysis module 234 is connected to the storage module 232.

The second data analysis module 234 is enabled in the battery discharging process. In the battery discharging process, the second data analysis module 234 periodically collects the anode voltage of the first battery 220 and the anode voltage of the second battery 221, and compares the collected anode voltage of the first battery 220 with the collected anode voltage of the second battery 221. When determining that a voltage difference between the anode voltage of the first battery 220 and the anode voltage of the second battery 221 is greater than a preset threshold (for example, 200 mV), the second data analysis module 234 outputs an enable signal to a second enable end EN3 of the second control module 235.

The second control module 235 includes a first enable end, the second enable end, and a plurality of output ends. The first enable end is connected to an external non-charge enable control signal source through the second enable control end EN2. The second enable end EN3 is connected to a control signal output end of the second data analysis module 234. Two output ends of the second control module 235 are connected to the control ends C1 and C2 in a one-to-one correspondence. The second control module 235 is enabled under joint action of an enable signal input by the second enable control end EN2 and an enable signal input by the second enable end EN3. In other words, the second control module 235 is enabled when the charging system has the power input from the outside and both the first battery 220 and the second battery 221 are not in the charging state. Alternatively, the electric potential difference between the anode of the first battery 220 and the anode of the second battery 221 is greater than the preset threshold (for example, 200 mV), and the charging system does not have the power input from the outside.

Figure 8:
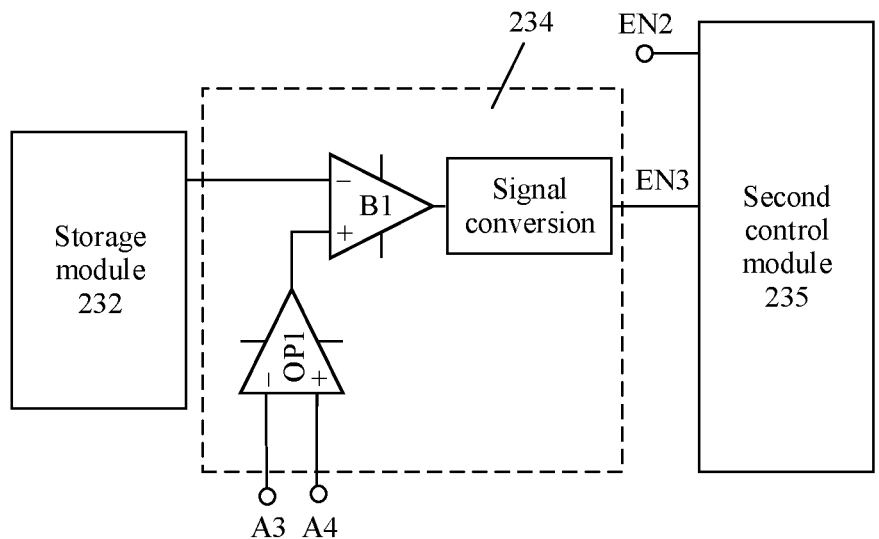
FIG. 8 is a diagram of a second data analysis module and a connection between the second data analysis module and another unit according to an embodiment of this application.

FIG. 8 is a diagram of an internal structure of the second data analysis module 234 and a connection between the second data analysis module 234 and another unit or module according to an embodiment of this application. The second data analysis module 234 includes a differential amplifier OP1, a first comparator B1, and a signal conversion module 2341. A first input end of the differential amplifier OP1 is connected to the anode of the first battery 220 through the signal collection end A4 of the control unit 23, and a second input end of the differential amplifier OP1 is connected to the anode of the second battery 221 through the signal collection end A3 of the control unit 23. An output end of the differential amplifier OP1 is connected to a first input end of the first comparator B1. A second input end of the first comparator B1 is connected to the storage module 232. An output end of the first comparator B1 is connected to an input end of the signal conversion module 2341, and an output end of the signal conversion module 2341 is connected to the second enable end EN3 of the second control module 235. Herein, the first comparator B1 is a hysteresis comparator. The signal conversion module 2341 is configured to convert a step signal provided by the first comparator B1 into a pulse signal.

Figure 9:
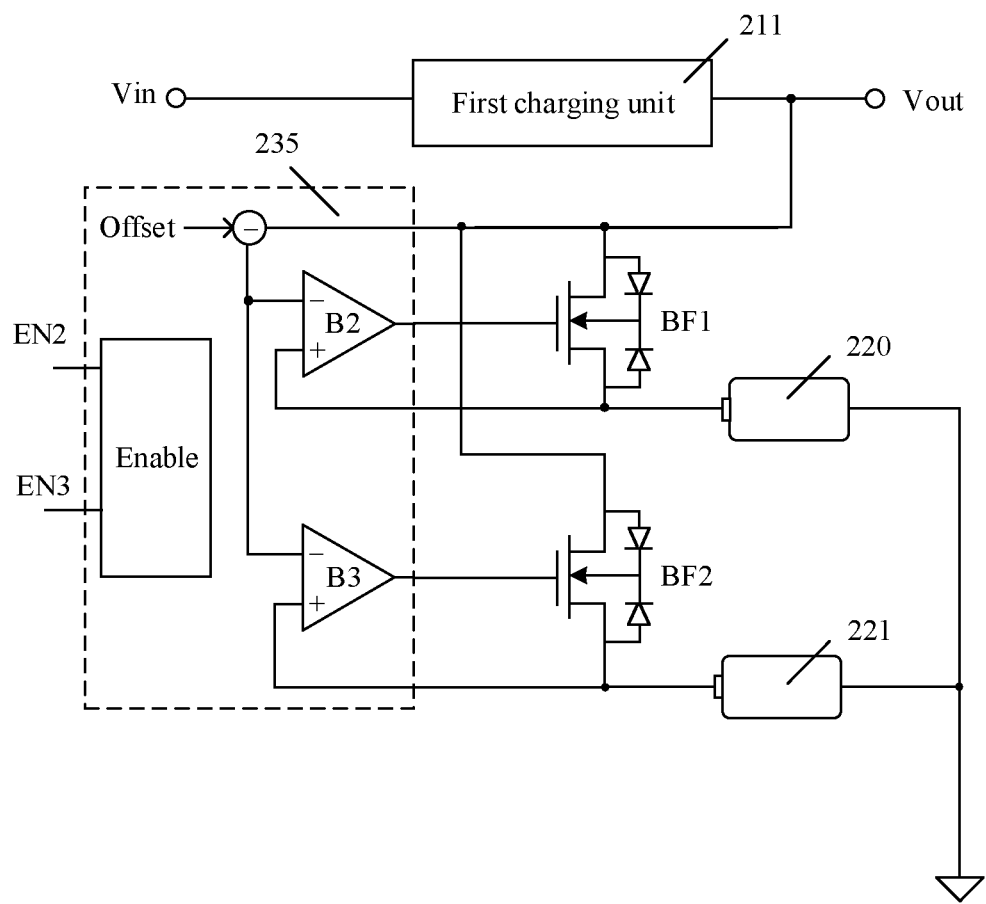
FIG. 9 is a diagram of a second control module and a connection between the second control module and another unit according to an embodiment of this application.

FIG. 9 is a diagram of the second control module 235 and a connection between the second control module 235 and another unit or module according to an embodiment of this application. The second control module 235 includes a second comparator B2, a third comparator B3, and an offset end. The second comparator B2 and the third comparator B3 may be hysteresis comparators. A first input end of the second comparator B2 is connected to the offset end and the first end of the first transistor BF1, and a second input end of the second comparator B2 is connected to the second end of the first transistor BF1 and the anode of the first battery 220. An output end of the second comparator B2 is connected to the gate of the first transistor BF1 through the control end C1. A first input end of the third comparator B3 is connected to the offset end and the first end of the second transistor BF2, and a second input end of the third comparator B3 is connected to the second end of the second transistor BF2 and the anode of the second battery 221. An output end of the third comparator B3 is connected to the gate of the second transistor BF2 through the control end C2. The output end Vout of the charging system 2 is connected to the offset end. The offset end is a bias end configured to provide a comparison bias voltage, so that effects of the hysteresis comparators can be enhanced. The offset end may bias the voltage provided by the output end Vout, and then provide a biased voltage to the first input end of the second comparator B2 and the first input end of the third comparator B3.

Based on the schematic diagrams of the structures of the control unit 23 shown in FIG. 7, the second data analysis module 234 shown in FIG. 8, and the second control module 235 shown in FIG. 9, the following describes a working principle of the charging system when the second control module 235 participates in working. When the charging system is connected to an external power supply system and the first enable control end EN1 is disabled, the second control module 235 is enabled under control of an enable signal sent by the second enable control end EN2. In this case, the first transistor BF1 and the second transistor BF2 are in the unidirectionally enabled state. The external power supply system supplies power to the load by using the first charging unit 211. The second comparator B2 monitors a difference between the electric potential of the output end Vout and the anode electric potential of the first battery 220 in real time, and the third comparator B3 monitors a difference between the electric potential of the output end Vout and the anode electric potential of the second battery 221 in real time. Herein, the second comparator B2 and the third comparator B3 work independently, and working principles of the second comparator B2 and the third comparator B3 are the same. The second comparator B2 is used as an example for description.

The second comparator B2 compares the electric potential input at the first input end with the electric potential input at the second input end. When it is determined that the difference between the electric potential of the output end Vout and the anode electric potential of the first battery 220 is greater than the preset threshold, and the electric potential of the output end Vout is lower than the anode electric potential of the first battery 220, it indicates that load energy consumption is excessively large, and a transient current of the output end Vout is excessively large. When a load capability of the first charging unit 211 is exceeded, the electric potential of the output end Vout continuously decreases. In this case, the second comparator B2 controls the first transistor BF1 to be enabled, so that the first battery 220 supplies power to the output end Vout by using the first transistor BF1, thereby effectively suppressing the continuous drop of the electric potential of the output end Vout, and supplying power to the output end Vout in time. When the second comparator B2 determines that the difference between the electric potential of Vout and the anode electric potential of the first battery 220 is less than the preset threshold, and the electric potential of the output end Vout is lower than the anode electric potential of the first battery 220, it indicates that the transient load current is canceled, and the electric potential of the output end Vout increases. In this case, the second comparator B2 controls the first transistor BF1 to be disabled.

When the charging system 2 is disconnected from the external power supply system, in other words, when no power from the outside is input to the charging system, the second control module 235 performs unidirectional enable control on the first transistor BF1 and the second transistor BF2. In other words, one of the first transistor BF1 and the second transistor BF2 works in the unidirectionally enabled state. In addition, the second control module 235 may further control a transistor located on a higher voltage path to work in the directionally enabled state.

When the charging system 2 is disconnected from the external power supply system, the batteries supply power to the load. The first battery 220 and the second battery 221 alternately supply power to the load. One of the batteries is in a discharging state, and it is assumed that the first battery 220 is in the discharging state. In this case, the first transistor BF1 is in the directionally enabled state, in other words, a current flows from the second end of the first transistor BF1 to the first end, and the second transistor BF2 is in the disabled state. When the second data analysis module 234 detects that the difference between the anode electric potential of the first battery 220 and the anode electric potential of the second battery 221 is greater than the preset threshold, the second data analysis module 234 sends a phase enable signal to the second enable end EN3 of the second control module 235. The first transistor BF1 and the second transistor BF2 work in the unidirectionally enabled state.

After the second enable end EN3 is enabled for a preset time period, enablement of the second enable end EN3 may be automatically stopped. In this case, the first transistor BF1 and the second transistor BF2 exit the unidirectionally enabled state. In this case, a branch in which the second transistor BF2 is located is the relatively high voltage path. Therefore, the second transistor BF2 is controlled to work in the directionally enabled state, and the first transistor BF1 is controlled to work in the disabled state. In this case, battery conversion discharging is completed.

It can be learned from the foregoing that dynamic switching of alternating power supply from the first battery 220 to the second battery 221 is completed in a working process in which the second enable end controls the second control module 235 to be enabled. In this way, in a process in which the first transistor BF1 is disabled and the second transistor BF2 is enabled, voltage instability is not caused by a delay for the transistors to be enabled and disabled, and the two batteries are prevented from charging each other. Stability of the charging system is improved in a process of switching from discharging of the first battery 220 to discharging of the second battery 221.

In an embodiment, both the first transistor BF1 and the second transistor BF2 may work in the unidirectionally enabled state. When the charging system 2 is disconnected from the external power supply system, the batteries supply power to the load. One of the batteries is in the discharging state, and it is assumed that the first battery 220 is in the discharging state. In this case, the first transistor BF1 is in the unidirectionally enabled state, and the second transistor BF2 is in the disabled state. When detecting that the voltage difference between the anodes of the first battery 220 and the second battery 221 is greater than the preset threshold (for example, 200 mV), and the anode voltage of the second battery 221 is greater than the anode voltage of the first battery 220, the second control module 235 controls the first transistor BF1 to be disabled and the second transistor BF2 to be unidirectionally enabled. In this case, the second battery 221 is in the discharging state.

Figure 10:
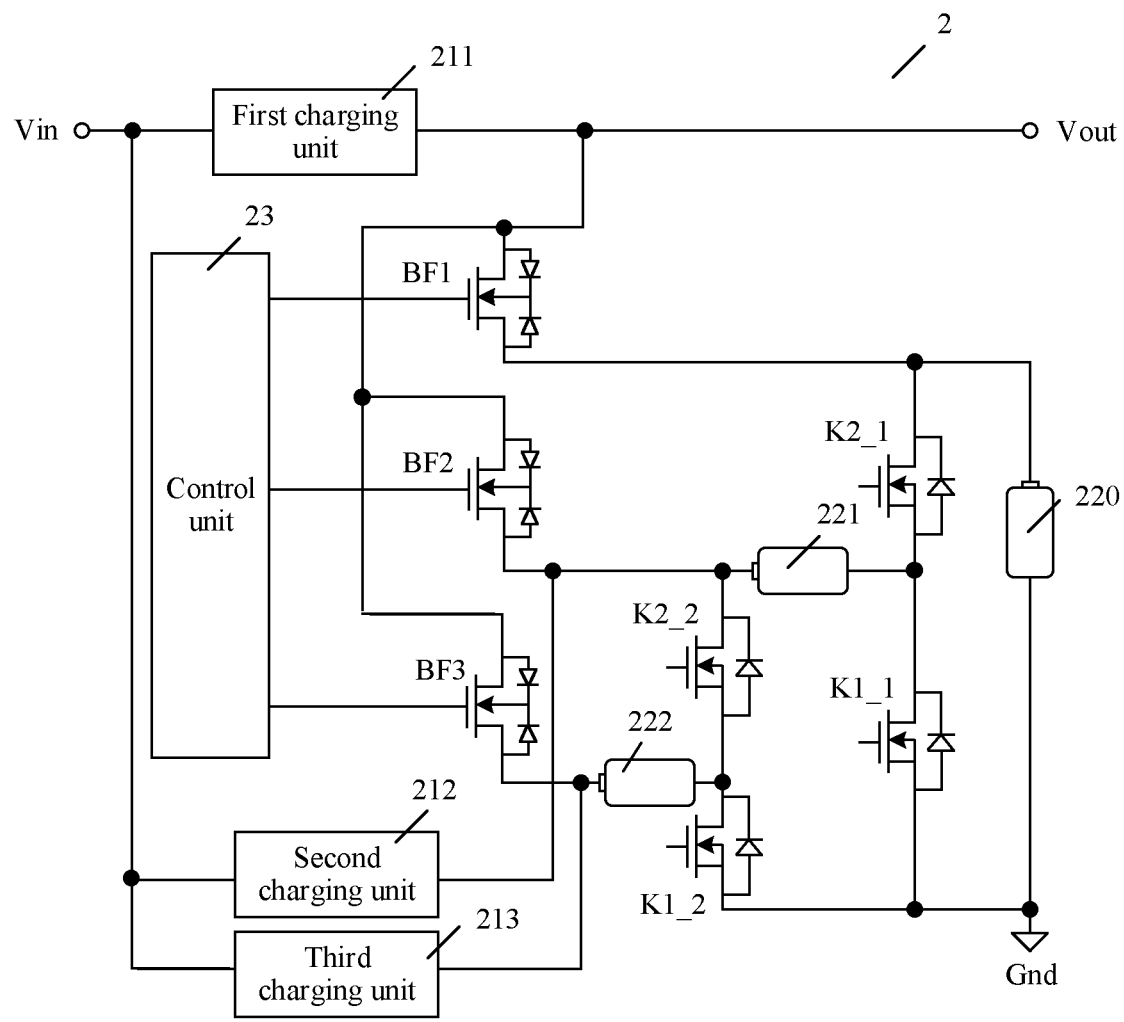
FIG. 10 is a diagram of a charging system according to an embodiment of this application.

FIG. 10 is a diagram of a charging system 2 according to an embodiment of this application.

In the embodiment shown in FIG. 10, the charging system 2 includes the voltage conversion circuit, the control circuit, the control unit 23, the input end Vin, and the output end Vout. The voltage conversion circuit includes the first charging unit 211 and the second charging unit 212, and the control circuit includes the first transistor BF1 and the second transistor BF2. Different from the foregoing embodiments, in this embodiment, the control circuit further includes a third transistor BF3, and the voltage conversion circuit further includes a third charging unit 213. The third transistor BF3 is connected between the output end Vout and a third battery 222. For structures and control logic of the transistors, refer to the related description of the transistors shown in FIG. 2. Details are not described herein again. For a working principle and beneficial effects of the first charging unit 211, refer to the description of the first charging unit 211 in FIG. 2. Details are not described herein again. The second charging unit 212 may be a charging unit that provides a two-battery serial charging mode. For a structure of the second charging unit 212, refer to the related description of the second charging unit 212 in the charging system shown in FIG. 8. Details are not described herein again. The third charging unit 213 may be a charging unit that provides a three-battery serial charging mode.

Figure 11:
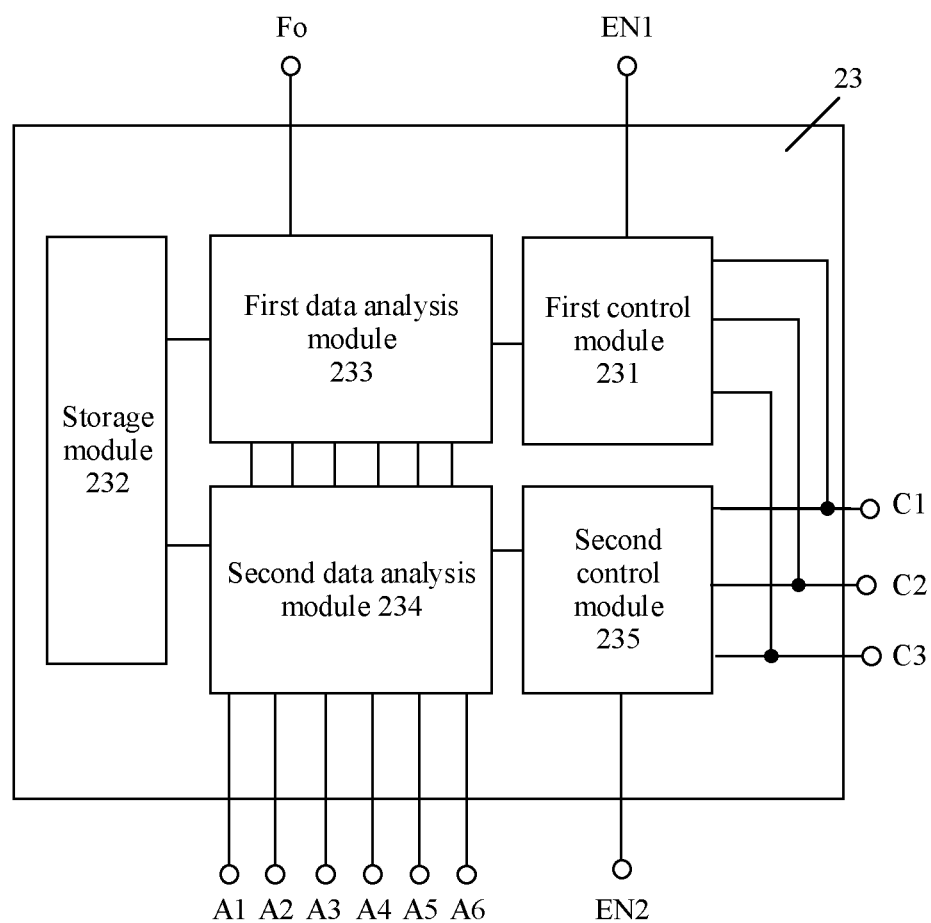
FIG. 11 is a diagram of a control unit according to an embodiment of this application.

A structure of the control unit 23 is shown in FIG. 11. The control unit 23 may include the first control module 231, the storage module 232, the first data analysis module 233, the second data analysis module 234, and the second control module 235. For internal connections and working principles of the parts, refer to the related description in FIG. 8. Details are not described herein again. Different from the control unit 23 shown in FIG. 8, the control unit shown in this embodiment includes the control end C1, the control end C2, and a control end C3. The three control ends C1, C2, and C3 are connected to the control end of the first transistor BF1, the control end of the second transistor BF2, and a control end of the third transistor BF3, respectively, in a one-to-one correspondence. The control unit 23 further includes the signal collection ends A1, A2, A3, A4, and signal collection ends A5 and A6. The signal collection ends A1, A2, and A3 are configured to collect the charging current of the first battery 220, the charging current of the second battery 221, and a charging current of the third battery 222, respectively. The signal collection ends A4, A5, and A6 are connected to the anode of the first battery 220, the anode of the second battery 221, and an anode of the third battery 222, respectively, in a one-to-one correspondence, to collect the anode voltage of the first battery 220, the anode voltage of the second battery 221, and an anode voltage of the third battery 222. The first enable end EN1 is enabled in the charging state, and the second enable end EN2 is enabled in a non-charging state.

In this embodiment, the charging system may charge the batteries in the first charging mode. The first charging mode may also be referred to as the battery independent charging mode. In this charging mode, the power from the outside is used to charge each battery by using the first charging unit 211. In this case, first switches K1_1 and K1_2 are turned on; the first transistor BF1 is enabled; second switches K2_1 and K2_2 are turned off; and the second transistor BF2 and the third transistor BF3 are disabled. The first battery 220 is charged. When the first battery 220 is fully charged, the first transistor BF1 is disabled, the second transistor BF2 is controlled to be enabled, and the second battery 221 is charged. When the second battery 221 is fully charged, the second transistor BF2 is disabled, the third transistor BF3 is controlled to be enabled, and the third battery 222 is charged. For a working principle of the first charging mode, refer to the related description of the first charging mode shown in FIG. 2. Details are not described herein again.

In this embodiment, the charging system may charge the batteries in the second charging mode. The second charging mode may also be referred to as the battery parallel charging mode. In this charging mode, the power from the outside is used to charge each battery by using the first charging unit 211. In this case, first, the first transistor BF1, the second transistor BF2, and the third transistor BF3 are controlled to be enabled, the first switches K1_1 and K1_2 are controlled to be turned on, and the second switches K2_1 and K2_2 are controlled to be turned off. The first battery 220, the second battery 221, and the third battery 222 are charged at the constant current. When an anode voltage of one of the batteries reaches the maximum constant-current charging voltage, the constant-voltage charging stage is switched to from the constant-current charging stage, until all batteries are fully charged. For a working principle of the second charging mode, refer to the related description of the second charging mode shown in FIG. 2. Details are not described herein again.

In this embodiment, the charging system may charge the batteries in the third charging mode. The third charging mode may also be referred to as a two-battery serial charging mode. In other words, as shown in FIG. 10, the first battery 220 and the second battery 221 are charged in series, and the third battery 222 is charged independently. In this charging mode, the power from the outside is used to charge each battery by using the first charging unit 211 and the second charging unit 212. In this case, first, the first transistor BF1 and the second transistor BF2 are controlled to be disabled, the first switch K1_1 and the fourth switch K1_2 are controlled to be turned off, the third transistor BF3 is enabled, and the second switch K2_1 and the third switch K1_2 are controlled to be turned on. The first battery 220 and the second battery 221 are charged in series. The second charging unit 212 supplies the power obtained from the input end Vin to the first battery 220 and the second battery 221. The third battery is independently charged, and the first charging unit 211 supplies the power obtained from the input end Vin to the third battery 222. When the anode voltage of one of the first battery 220 and the second battery 221 reaches the maximum constant-current charging voltage, the first battery 220 and the second battery 221 switch from serial charging to parallel charging. Refer to the related description of the second charging mode. Details are not described herein again.

In this embodiment, the charging system may charge the batteries in the fourth charging mode. The fourth charging mode may also be referred to as a three-battery serial charging mode. In other words, as shown in FIG. 10, the first battery 220, the second battery 221, and the third battery 222 are charged in series. In the charging mode, the first charging unit 211 cooperates with the third charging unit 213 to charge the batteries. First, the first transistor BF1 is controlled to work in the unidirectionally enabled state; the second transistor BF2 and the third transistor BF3 are enabled; the second switches K2_1 and K2_2 are controlled to be turned on; and the first switches K1_1 and K1_2 are controlled to be turned off. In this case, the third charging unit charges the first battery 220, the second battery 221, and the third battery 222 at the constant current. When the anode voltage of one of the batteries reaches the maximum charging voltage, a parallel charging phase is switched to from the serial charging phase. In other words, the first battery 220, the second battery 221, and the third battery 222 are switched from serial charging to parallel charging. Refer to the related description of the second charging mode. Details are not described herein again.

Figure 12:
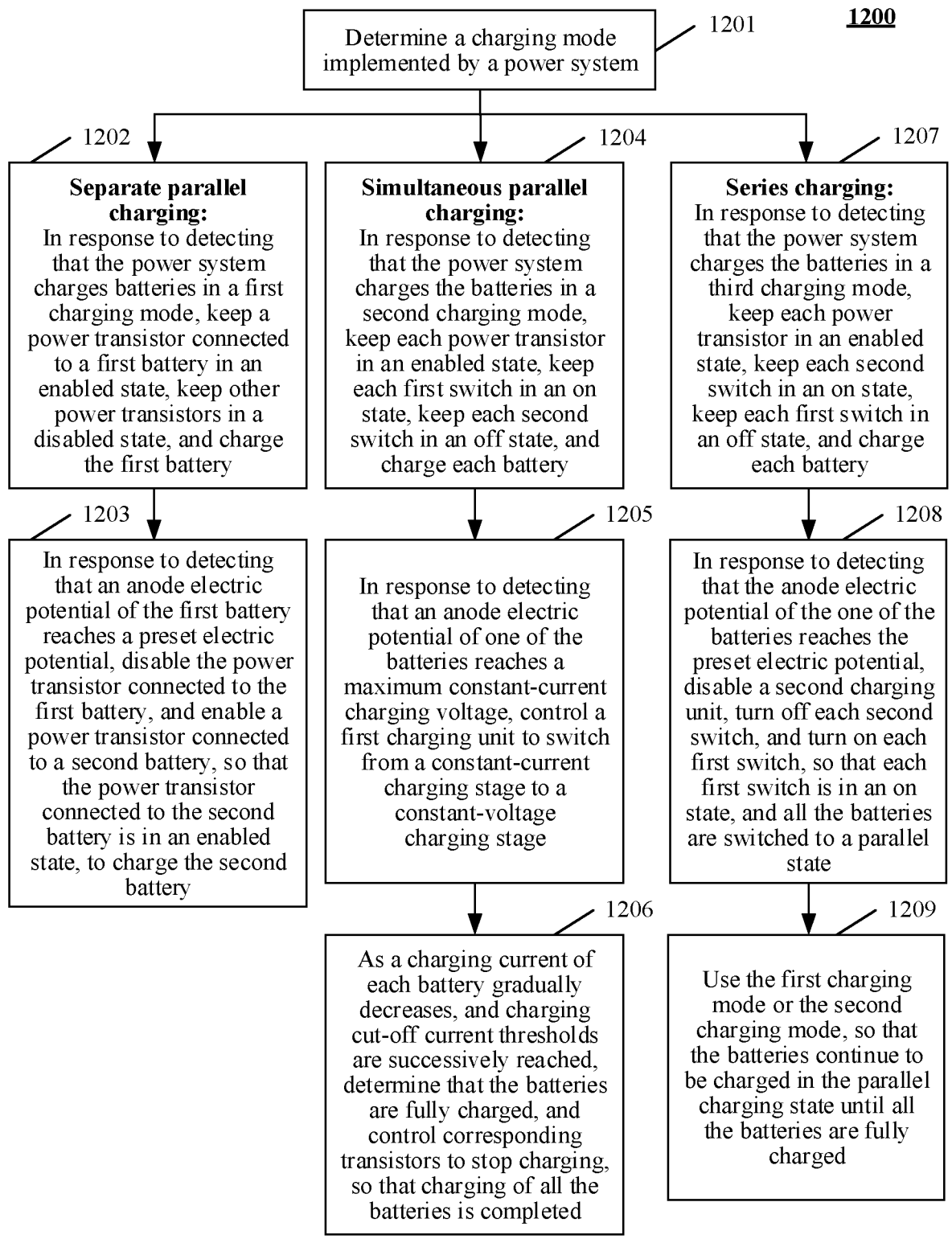
FIG. 12 is a flowchart of a charging method according to an embodiment of this application.

FIG. 12 shows a charging method 1200 according to an embodiment of this application. The charging method is applied to the charging system shown in the foregoing embodiments. The charging method 1200 includes step 1201: Determine a charging mode implemented by the charging system. Step 1202: In response to detecting that the charging system charges batteries in a first charging mode, keep a transistor connected to a first battery in an enabled state, keep other transistors in a disabled state, and charge the first battery. Step 1203: In response to detecting that an anode electric potential of the first battery reaches a preset electric potential, disable the transistor connected to the first battery, and enable a transistor connected to a second battery, so that the transistor connected to the second battery is in an enabled state, to charge the second battery.

In some optional implementations, the method further includes a step of charging the batteries in a second charging mode. Step 1204 is included: In response to detecting that the charging system charges the batteries in the second charging mode, keep each transistor in an enabled state, keep each first switch in an on state, keep each second switch in an off state, and charge each battery. Step 1205: In response to detecting that an anode electric potential of one of the batteries reaches a maximum constant-current charging voltage, control a first charging unit to switch from a constant-current charging stage to a constant-voltage charging stage. Step 1206: As a charging current of each battery gradually decreases, and charging cut-off current thresholds are successively reached, determine that the batteries are fully charged, and control corresponding transistors to stop charging, so that charging of all the batteries is completed.

In some optional implementations, the method further includes a step of charging the batteries in a third charging mode. Step 1207 is included: In response to detecting that the charging system charges the batteries in the third charging mode, keep each transistor in the enabled state, keep each second switch in the on state, keep each first switch in the off state, and charge each battery. Step 1208: In response to detecting that the anode electric potential of one of the batteries reaches the preset electric potential, disable a second charging unit, turn off each second switch, and turn on each first switch, so that each first switch is in the on state, and all the batteries are switched to a parallel state. Step 1209: Use the first charging mode or the second charging mode, so that the batteries continue to be charged in the parallel charging state until all the batteries are fully charged.

In an embodiment, the charging system may further charge the batteries in a fourth charging mode. The fourth charging mode is also a serial charging mode. A charging method includes: keep an $n^{th}$ transistor (for example, the second transistor BF2 shown in FIG. 2, or the third transistor BF3 shown in FIG. 10) in a bidirectionally enabled state, keep the other transistors in a unidirectionally enabled state or a disabled state, keep each second switch in the on state, keep each first switch in the off state, and charge each battery. In this case, the first charging unit enables charging, or both the first charging unit and the second charging unit enable charging. In response to detecting that the anode electric potential of one of the batteries reaches the preset electric potential, a transistor connected to a battery that reaches the preset electric potential is disabled, each second switch is turned off, each first switch is turned on, so that each first switch is in the on state, and the first charging mode or the second charging mode is continued to be used to charge the batteries.

In an embodiment, each transistor is kept in the enabled state, each first switch is kept in the on state, each second switch is kept in the off state, and each battery is charged. This includes: initializing the first charging unit, so that an electric potential of an output end of the first charging unit is higher than an anode electric potential of each battery; collecting an anode voltage and a charging current of each battery, comparing the collected charging current with a preset charging current of each battery, and determining whether the charging current of each battery reaches the preset charging current; in response to determining that a charging current of at least one battery does not reach the preset charging current, selecting a maximum anode electric potential and a minimum anode electric potential from the collected anode voltages of the batteries, and determining whether a difference between the maximum anode electric potential and the minimum anode electric potential is greater than a preset threshold; and in response to determining that the difference between the maximum anode electric potential and the minimum anode electric potential is greater than the preset threshold, feeding back the maximum anode electric potential to a feedback signal input end of the first charging unit, so that the output end of the first charging unit outputs the maximum anode electric potential.

In an embodiment, when it is determined that the difference between the maximum anode electric potential and the minimum anode electric potential is greater than the preset threshold, a difference between the charging current of each battery and the preset charging current of each battery may be further determined. The current differences are converted into error signals based on a preset conversion manner, and a minimum error signal value is selected. When it is determined that a voltage requested by the minimum error signal is higher than the anode electric potential of each battery, the voltage requested by the minimum error signal is provided to the feedback signal input end of the first charging unit 211, so that the first charging unit adjusts an output voltage based on the received error signal value.

For a implementation of the charging method shown in the embodiments of this application, refer to the related descriptions in the embodiments shown in FIG. 2 to FIG. 11. Details are not described herein again.

FIG. 13 shows a discharging method 1300 according to an embodiment of this application. The discharging method is applied to the charging system shown in the foregoing embodiments. The discharging method 1300 includes: Step 1301: Select one battery as a first battery to perform discharging, use other undischarged batteries as a second battery, and perform the following procedure for discharging: keeping a transistor corresponding to a discharging branch of the first battery in a directionally enabled state and a first switch in an on state; keeping a transistor corresponding to a discharging branch of the second battery in a unidirectionally enabled state; keeping each second switch in an off state; and discharging the first battery.

Step 1302: In response to detecting that a difference between anode electric potentials of the first battery and the second battery is greater than a preset threshold, control a transistor corresponding to a discharging branch of a discharging battery to be disabled; use a battery whose anode electric potential difference from the anode electric potential of the first battery is greater than the preset threshold as the second battery; and continue to perform the procedure for discharging.

In some optional implementations, the discharging method further includes: in response to detecting that a voltage difference between at least two batteries is greater than the preset threshold and no power from the outside is input to the charging system, or in response to detecting that there is power from the outside input to the charging system and that the batteries are all not is in a charging state, the following steps are performed: collecting an anode electric potential of each charging battery at a preset time interval; in response to that a difference between a collected anode electric potential of at least one battery and an electric potential output by an output end of the charging system is greater than the preset threshold, and the electric potential output by the output end of the charging system is lower than the anode electric potential of the battery, controlling the transistors to be enabled, to discharge each battery; and in response to the difference between the collected anode electric potential of each battery and the electric potential output by the output end of the charging system is less than the preset threshold, controlling the transistors to be disabled.

FIG. 14 is a schematic diagram of an electronic device 1400 according to an embodiment of this application. The electronic device 1400 may be a portable computer (for example, a mobile phone), a notebook computer, a wearable electronic device (for example, a smartwatch), a tablet computer, an augmented reality (AR) device, a virtual reality (VR) device, a vehicle-mounted device, or the like. The electronic device shown in this application includes the charging system shown in any one of the embodiments in FIG. 1 to FIG. 4 and FIG. 6 to FIG. 11. The electronic device further includes at least two batteries, and a voltage conversion circuit and a control circuit of the electronic device are connected to the at least two batteries.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

The invention claimed is:

1. A charging system, comprising:
a voltage conversion circuit configured to be connected to an external power supply at an input end Vin and receive electrical power from the power supply, configured to be connected to a load at an output end Vout, and further configured to be connected to M batteries, M being an integer greater than or equal to 2;
a control circuit connected to the M batteries, the control circuit being configured to switch a connection relationship between the M batteries to connect at least one battery of the M batteries to the voltage conversion circuit, the connection relationship comprising at least one of a serial connection or a parallel connection, the control circuit comprising M transistors and the M transistors are battery field effect transistors (BAT-FETs), first ends of the M transistors are connected to the output end Vout, and a second end of each of the M transistors is connected to an anode of a corresponding battery of the M batteries;
the voltage conversion circuit is configured to:
receive the electrical power from the power supply and charge the at least one battery;
supply power to the output end Vout and the load; and
wherein the charging system further comprises a control unit configured to control a gate of any transistor in the M transistors and to control the M transistors to work in a unidirectionally enabled state, a bidirectionally enabled state, or a disabled state to manage the M batteries independently.

2. The charging system according to claim 1, wherein: the control circuit comprises, M−1 first switches and M−1 second switches;
each of the second switches is connected between two of the M batteries and is configured to connect the two of the M batteries in series; and
each of the first switches is connected between one of M batteries and a ground, and is configured to connect the one of the M batteries to the ground and connect the one battery and a battery other than the M−1 batteries in the M batteries in parallel.

3. The charging system according to claim 2, the control unit configured to control each of the M−1 first switches and each of the M−1 second switches to be turned on or turned off, to switch the connection relationship between the M batteries.

4. The charging system according to claim 3, wherein any one of the M−1 first switches and the M−1 second switches is a transistor switch, and the control unit is configured to control a gate of the transistor switch, to control the transistor switch to be turned on or turned off.

5. The charging system according to claim 3, wherein the control unit is further configured to:
collect operating parameters of the M batteries;
control the gates of the M transistors based on the operating parameters; and
control each of the M−1 first switches and each of the M−1 second switches to be turned on or turned off, wherein the operating parameters comprise at least one of an anode voltage or an anode current.

6. The charging system according to claim 5, wherein the control unit is further configured to collect an output voltage provided by the voltage conversion circuit to supply power to the load through the output end Vout, and the control unit comprises a first comparator configured to:
compare an anode voltage of any battery with the output voltage to obtain a first comparison result; and
control, based on the first comparison result, a gate of a transistor corresponding to the any battery to control the transistor to work in a unidirectionally enabled state.

7. The charging system according to claim 5, wherein the control unit further comprises a second comparator configured to:
compare an operating parameter of the at least one battery of the M batteries with a preset parameter to obtain a second comparison result; and
control, based on the second comparison result, the output voltage provided by the voltage conversion circuit to supply power to the load through the output end Vout.

8. The charging system according to claim 1, wherein the voltage conversion circuit comprises:
a first charging unit configured to charge one battery of the M batteries or charge at least two batteries connected in parallel in the M batteries; and
a second charging unit or a third charging unit configured to charge at least two batteries connected in series in the M batteries.

9. An electronic device, comprising:
M batteries, M being an integer greater than or equal to 2;
a charging system, the charging system comprising a voltage conversion circuit, a control circuit, an input end Vin, and an output end Vout, the voltage conversion circuit and the control circuit being connected to the M batteries, the input end Vin is configured to receive electrical power from an external power supply and the output end Vout is configured to be connected to a load;
the control circuit is configured to switch a connection relationship between the M batteries to connect at least one battery of the M batteries to the voltage conversion circuit, the connection relationship comprising at least one of a serial connection or a parallel connection, the control circuit comprising M transistors and the M transistors are battery field effect transistors (BATFETs), first ends of the M transistors are connected to the output end Vout, and a second end of each of the M transistors is connected to an anode of a corresponding battery of the M batteries;

the voltage conversion circuit is connected to the input end Vin and the output end Vout, the voltage conversion circuit is configured to charge the at least one battery and is further configured to supply power to the output end Vout and the load; and wherein the charging system further comprises a control unit configured to control a gate of any transistor in the M transistors and to control the M transistors to work in a unidirectionally enabled state, a bidirectionally enabled state, or a disabled state to manage the M batteries independently.

10. The electronic device according to claim 9, wherein the control circuit comprises M−1 first switches and M−1 second switches;

each of the second switches is connected between two of the M batteries and is configured to connect the two of the M batteries in series; and each of the first switches is connected between one of M batteries and a ground, and is configured to connect the one of the M batteries to the ground and connect the one battery and a battery other than the M−1 batteries in the M batteries in parallel.

11. The electronic device according to claim 10, wherein the control unit configured to control each of the M−1 first switches and each of the M−1 second switches to be turned on or turned off, to switch the connection relationship between the M batteries.

12. The electronic device according to claim 11, wherein any one of the M−1 first switches and the M−1 second switches is a transistor switch, and the control unit is configured to control a gate of the transistor switch, to control the transistor switch to be turned on or turned off.

13. The electronic device according to claim 11, wherein the control unit is further configured to:

collect operating parameters of the M batteries;

control the gates of the M transistors based on the operating parameters; and control each of the M−1 first switches and each of the M−1 second switches to be turned on or turned off, wherein the operating parameters comprise at least one of an anode voltage or an anode current.

14. The electronic device according to claim 13, wherein the control unit is further configured to collect an output voltage provided by the voltage conversion circuit to supply power to the load through the output end Vout, and the control unit comprises a first comparator configured to:

compare an anode voltage of any battery with the output voltage to obtain a first comparison result; and control, based on the first comparison result, a gate of a transistor corresponding to the any battery to control the transistor to work in a unidirectionally enabled state.

15. The electronic device according to claim 13, wherein the control unit further comprises a second comparator configured to:

compare an operating parameter of the at least one battery of the M batteries with a preset parameter to obtain a second comparison result; and control, based on the second comparison result, the output voltage provided by the voltage conversion circuit to supply power to the load through the output end Vout.

16. The electronic device according to claim 9, wherein the voltage conversion circuit comprises:

a first charging unit configured to charge one battery of the M batteries or charge at least two batteries connected in parallel in the M batteries; and a second charging unit or a third charging unit configured to charge at least two batteries connected in series in the M batteries.

17. A charging method, comprising:

switching, by a control circuit in a charging system, a connection relationship between M batteries connected to the charging system to connect at least one battery of the M batteries to a voltage conversion circuit in the charging system, the connection relationship comprising at least one of a serial connection or a parallel connection, wherein the control circuit comprises M transistors and the M transistors are battery field effect transistors (BATFETs), first ends of the M transistors are connected to the output end Vout, and a second end of each of the M transistors is connected to an anode of a corresponding battery of the M batteries, M being an integer greater than or equal to 2;

receiving, by the voltage conversion circuit, electrical power from an external power supply through an input end Vin of the charging system;

charging, by the voltage conversion circuit, the at least one battery; and supplying, by the voltage conversion circuit, power to a load through an output end Vout of the charging system;

wherein the control circuit comprises M transistors and the M transistors are BATFET, first ends of the M transistors are connected to the output end Vout, and a second end of each of the M transistors is connected to an anode of one of the M batteries;

wherein the switching controls the M transistors to work in a unidirectionally enabled state, a bidirectionally enabled state, or a disabled state to manage the M batteries independently.

* * * * *